US011522429B2

(12) United States Patent
Takahashi et al.

(10) Patent No.: US 11,522,429 B2
(45) Date of Patent: Dec. 6, 2022

(54) VIBRATION ACTUATOR AND VIBRATION PRESENTING APPARATUS

(71) Applicants: Yuki Takahashi, Tokyo (JP); Tomoya Ishitani, Tokyo (JP)

(72) Inventors: Yuki Takahashi, Tokyo (JP); Tomoya Ishitani, Tokyo (JP)

(73) Assignee: MINEBEA MITSUMI INC., Nagano (JP)

( * ) Notice: Subject to any disclaimer, the term of this patent is extended or adjusted under 35 U.S.C. 154(b) by 349 days.

(21) Appl. No.: 16/669,567

(22) Filed: Oct. 31, 2019

(65) Prior Publication Data

US 2020/0136488 A1 Apr. 30, 2020

(30) Foreign Application Priority Data

Oct. 31, 2018 (JP) .............................. JP2018-206111

(51) Int. Cl.
  *H02K 33/06* (2006.01)
  *H02K 33/16* (2006.01)
  (Continued)

(52) U.S. Cl.
  CPC ............. *H02K 33/06* (2013.01); *H02K 33/16* (2013.01); *B06B 1/045* (2013.01); *H02K 33/00* (2013.01); *H02K 33/02* (2013.01); *H02K 33/04* (2013.01)

(58) Field of Classification Search
  CPC ........ B06B 1/045; H02K 33/00; H02K 33/02; H02K 33/04; H02K 33/06; H02K 33/16
  (Continued)

(56) References Cited

U.S. PATENT DOCUMENTS

| | | | | |
|---|---|---|---|---|
| 7,671,493 | B2 * | 3/2010 | Takashima | .............. G06F 3/016 310/15 |
| 8,379,906 | B2 * | 2/2013 | Kang | ..................... H04R 9/027 381/415 |

(Continued)

FOREIGN PATENT DOCUMENTS

| | | |
|---|---|---|
| JP | 2015-070729 A | 4/2015 |
| JP | 2016-163854 A | 9/2016 |
| WO | 2005/115094 A2 | 12/2005 |

OTHER PUBLICATIONS

Extended European Search report dated Mar. 6, 2020, from EP application No. 19206166.1, 8 pages.

*Primary Examiner* — Rashad H Johnson
(74) *Attorney, Agent, or Firm* — Brundidge & Stanger, P.C.

(57) ABSTRACT

Provided is a vibration actuator that includes: a fixing part including a coil, and a core around which the coil is wound, the core including both ends projecting from the coil; a movable part disposed adjacent and opposite to the both ends of the core with a gap provided therebetween in a direction crossing with a winding axis of the coil, the movable part including a yoke formed of a magnetic material, the movable part being fixable to an operation contact surface part that is operated by contact; and a plate-shaped elastic part fixed between the movable part and the fixing part, the plate-shaped elastic part including an elastically deformable bellows-shaped part, the plate-shaped elastic part elastically supporting the movable part to be movable with respect to the fixing part in a direction opposite to at least one of the both ends.

16 Claims, 17 Drawing Sheets

(51) Int. Cl.
*B06B 1/04* (2006.01)
*H02K 33/02* (2006.01)
*H02K 33/04* (2006.01)
*H02K 33/00* (2006.01)

(58) Field of Classification Search
USPC .............................. 310/12.14, 15, 24, 25, 29
See application file for complete search history.

(56) References Cited

U.S. PATENT DOCUMENTS

| | | | | |
|---|---|---|---|---|
| 11,081,950 B2* | 8/2021 | Zhang | .................... | H02K 33/18 |
| 2004/0169425 A1* | 9/2004 | Aihara | .................... | B06B 1/045 |
| | | | | 310/15 |
| 2008/0216578 A1* | 9/2008 | Takashima | .............. | G06F 3/016 |
| | | | | 73/649 |
| 2011/0148554 A1 | 6/2011 | Cho et al. | | |
| 2011/0181131 A1* | 7/2011 | Pu | .......................... | H02K 33/16 |
| | | | | 310/28 |
| 2011/0266892 A1* | 11/2011 | Wauke | ................... | H02K 33/18 |
| | | | | 310/25 |
| 2014/0202252 A1* | 7/2014 | Umehara | ................. | H02K 1/34 |
| | | | | 73/664 |
| 2014/0232211 A1* | 8/2014 | Katada | ................... | H02K 33/16 |
| | | | | 310/25 |
| 2015/0169061 A1 | 6/2015 | Odajima et al. | | |
| 2016/0172950 A1 | 6/2016 | Shim et al. | | |
| 2016/0226362 A1* | 8/2016 | Wang | ..................... | H02K 33/16 |
| 2016/0336842 A1* | 11/2016 | Chun | ..................... | H02K 33/16 |
| 2017/0056927 A1* | 3/2017 | Chun | ..................... | B06B 1/045 |
| 2017/0120297 A1* | 5/2017 | Chun | ..................... | B06B 1/045 |
| 2017/0214306 A1* | 7/2017 | Katada | .................... | H02K 33/16 |
| 2017/0222533 A1* | 8/2017 | Liu | ......................... | H02K 1/34 |
| 2017/0288523 A1* | 10/2017 | Katada | .................. | H02P 25/032 |
| 2017/0317568 A1* | 11/2017 | Ishii | ....................... | H02K 33/02 |
| 2018/0152090 A1* | 5/2018 | Umehara | ................ | H02K 5/225 |
| 2018/0238411 A1* | 8/2018 | Sharkh | ................... | F16F 7/1011 |
| 2018/0239432 A1* | 8/2018 | Hwang | ................ | G06F 3/04886 |
| 2018/0278136 A1* | 9/2018 | Odajima | ................ | H02K 33/12 |
| 2019/0345941 A1* | 11/2019 | Yoo | ...................... | F01C 17/066 |
| 2020/0052567 A1* | 2/2020 | Yamada | ................. | H01F 7/066 |
| 2020/0136488 A1* | 4/2020 | Takahashi | ............. | H02K 33/06 |
| 2020/0156112 A1* | 5/2020 | Wauke | ................... | B06B 1/045 |
| 2020/0161038 A1* | 5/2020 | Tsuchihashi | ........... | H02K 33/16 |
| 2020/0161955 A1* | 5/2020 | Kitahara | ................ | H02K 33/06 |
| 2020/0366177 A1* | 11/2020 | Maeda | ................... | H02K 35/02 |
| 2020/0389077 A1* | 12/2020 | Ma | ......................... | H02K 33/02 |
| 2020/0412226 A1* | 12/2020 | Ma | ......................... | H02K 33/18 |
| 2021/0111654 A1* | 4/2021 | Ishitani | .................. | G06F 3/016 |
| 2021/0149491 A1* | 5/2021 | Takahashi | ........... | G06F 3/03547 |
| 2022/0111418 A1* | 4/2022 | Takahashi | .............. | H02K 33/02 |

* cited by examiner

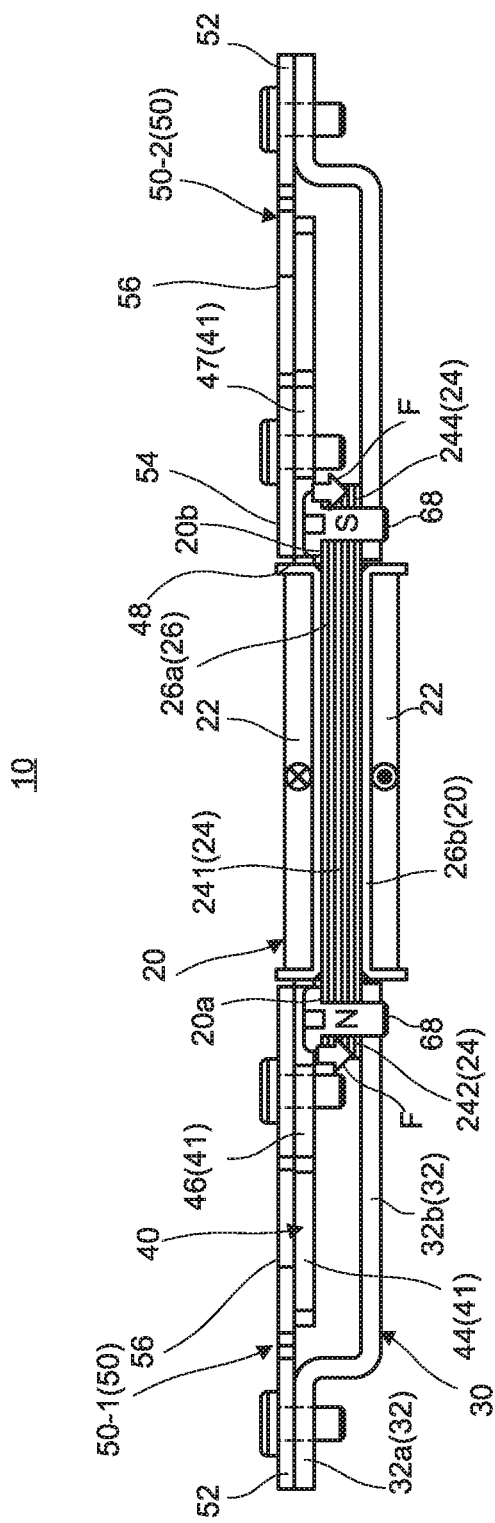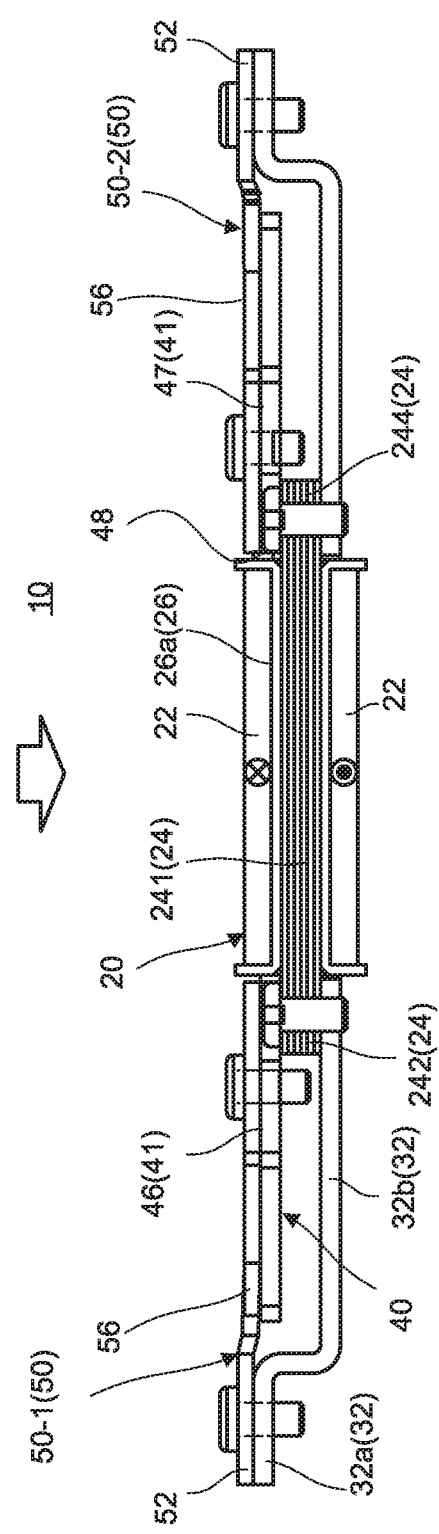
FIG. 9A
FIG. 9B

VIBRATION ACTUATOR AND VIBRATION PRESENTING APPARATUS

CROSS REFERENCE TO RELATED APPLICATIONS

This application is entitled to and claims the benefit of Japanese Patent Application No. 2018-206111, filed on Oct. 31, 2018, the disclosure of which including the specification, drawings and abstract is incorporated herein by reference in its entirety.

TECHNICAL FIELD

The present invention relates to a vibration actuator and a vibration presenting apparatus including the same.

BACKGROUND ART

Conventionally, there is known a configuration where vibration is given to a finger pulp by a vibration actuator when the finger pulp or the like of a user touches a display screen displayed on a touch panel at the time of operating the touch panel that is a sensor panel (see PTL 1 and PTL 2).

PTL 1 discloses a mobile terminal apparatus having a vibration actuator attached on a back surface of a touch panel via a vibration transmitting part. In this vibration actuator, a movable body is disposed inside a housing fixed to the vibration transmitting part to be reciprocally movable along a guide shaft disposed vertically with respect to the touch panel. With this vibration actuator, the movable body is collided with the housing in response to an operation to the touch panel to give vibration to the finger pulp that is touching the touch panel via the vibration transmitting part.

Further, PTL 2 discloses a vibration presenting apparatus that gives vibration in response to operations to a touch panel. In this vibration presenting apparatus, a voice coil motor for generating vibration, a support part that is disposed with a vibration panel and compressed by a prescribed force, a damper that gives breaking work on the vibration of a vibration part, and a spring that gives a compression force to the support part and the damper are provided in parallel between a vibration panel that is the vibration part presenting vibration and a housing that supports the vibration panel.

CITATION LIST

Patent Literature

PTL 1
Japanese Patent Application Laid-Open No. 2015-070729
PTL 2
Japanese Patent Application Laid-Open No. 2016-163854

SUMMARY OF INVENTION

Technical Problem

Incidentally, for the apparatus giving an operational feeling by using vibration on an operation contact surface operated by contact such as a display screen of a touch panel, the apparatus is desired to be as thin as possible.

In the apparatus with which the movable body is reciprocally moved (vibrated) vertically with respect to the touch panel in response to operations on the touch panel like the apparatuses of PTLS 1 and 2, stronger vibration can be given to the finger pulp that touches the touch panel than the apparatus that vibrates the movable body in parallel to the touch panel.

However, PTL 1 requires the shaft and a supporting mechanism of the shaft in order to move the movable body vertically with respect to the touch panel. Further, it is required in PTL 2 to provide the support part, the damper, and the spring between the housing and the vibration panel. Therefore, with PTL 1 and PTL 2, it is required to have thickness for securing the space for disposing the shaft and the supporting mechanism of the shaft as well as the support part, the damper, and the spring, respectively.

Also, magnets are essential structural components in PTL 1 and PTL 2, and there is a demand for reducing the cost as much as possible by omitting the magnets.

An object of the present invention is to provide a vibration actuator capable of giving a preferable operational feeling to users at the time of operating a touch panel while reducing the thickness and the cost even when attached to the touch panel, and to provide a vibration presenting apparatus including the same.

Solution to Problem

In order to achieve the abovementioned objects, a vibration actuator of the present invention includes: a fixing part including a coil, and a core around which the coil is wound, the core including both ends projecting from the coil; a movable part disposed adjacent and opposite to the both ends of the core with a gap provided therebetween in a direction crossing with a winding axis of the coil, and the movable part including a yoke formed of a magnetic material, the movable part being fixable to an operation contact surface part that is operated by contact; and a plate-shaped elastic part fixed between the movable part and the fixing part, the plate-shaped elastic part including an elastically deformable bellows-shaped part, the plate-shaped elastic part elastically supporting the movable part to be movable with respect to the fixing part in a direction opposite to at least one of the both ends of the core.

A vibration presenting apparatus of the present invention includes: the vibration actuator described above; and a touch panel on which the vibration actuator is mounted.

Advantageous Effects of Invention

The present invention is capable of giving a preferable operational feeling to the user at the time of operating the touch panel and reducing the thickness even when attached to the touch panel.

BRIEF DESCRIPTION OF DRAWINGS

FIGS. 9A and 9B are diagrams used for describing operations of the vibration actuator according to Embodiment 1 of the present invention;

DESCRIPTION OF EMBODIMENTS

Hereinafter, embodiments of the present invention will be described in detail by referring to the accompanying drawings.

An orthogonal coordinate system (X, Y, Z) is used for describing the embodiments. The same orthogonal coordinate system (X, Y, Z) is used also in illustrations of the drawings to be described later. Hereinafter, the width, length, and height of vibration actuator 10 are lengths in X-direction, Y-direction, and Z-direction, respectively. In addition, descriptions will be provided assuming that the plus side in the Z-direction is "upper side" and the minus side in the Z-direction is "lower side".

Embodiment 1

<Entire Configuration of Vibration Actuator 10>

Figure 1:
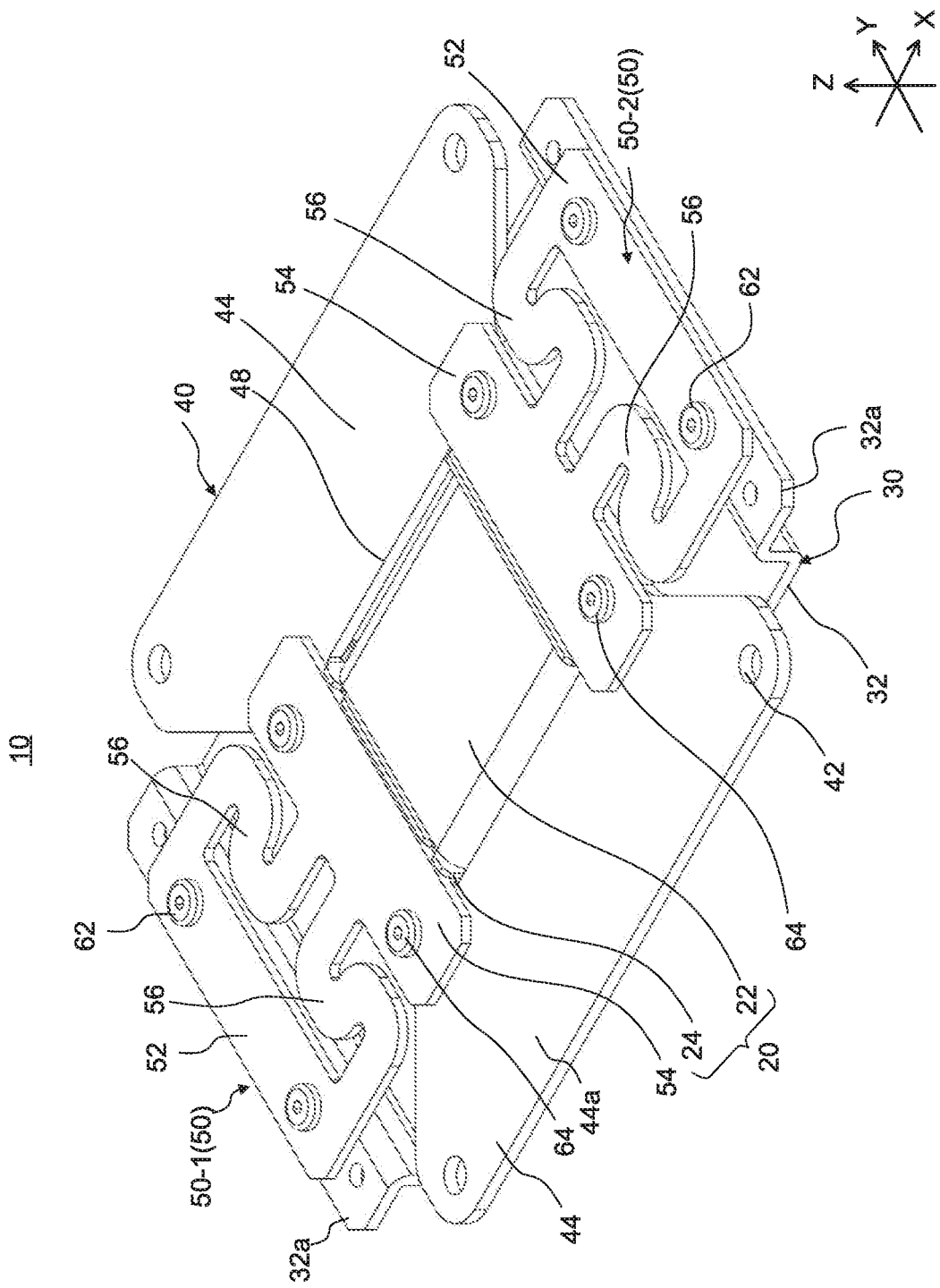
FIG. 1 is a plane-side appearance perspective view of a vibration actuator according to Embodiment 1 of the present invention.
Figure 2:
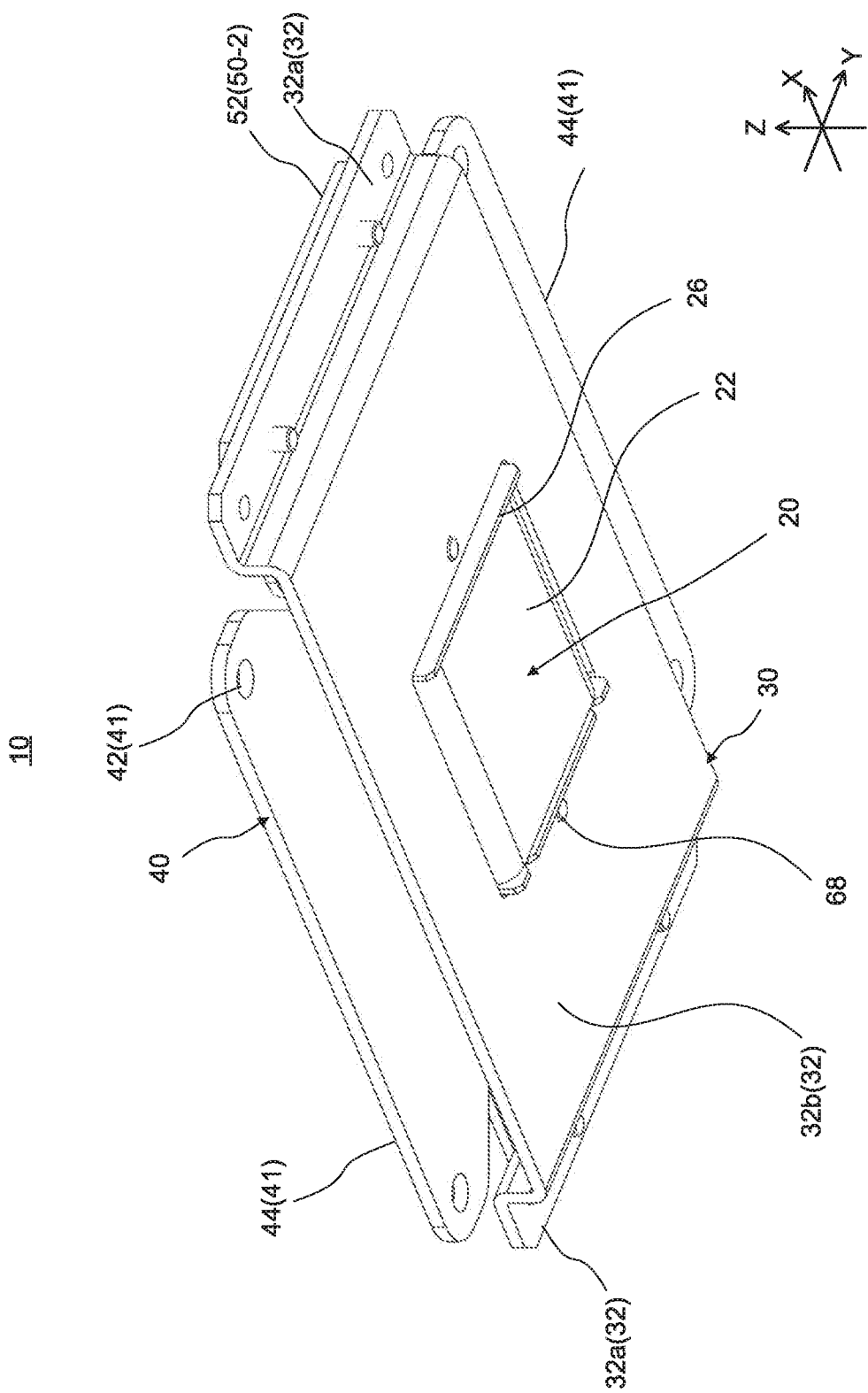
FIG. 2 is a bottom-surface side appearance perspective view of the vibration actuator according to Embodiment 1 of the present invention.
Figure 3:
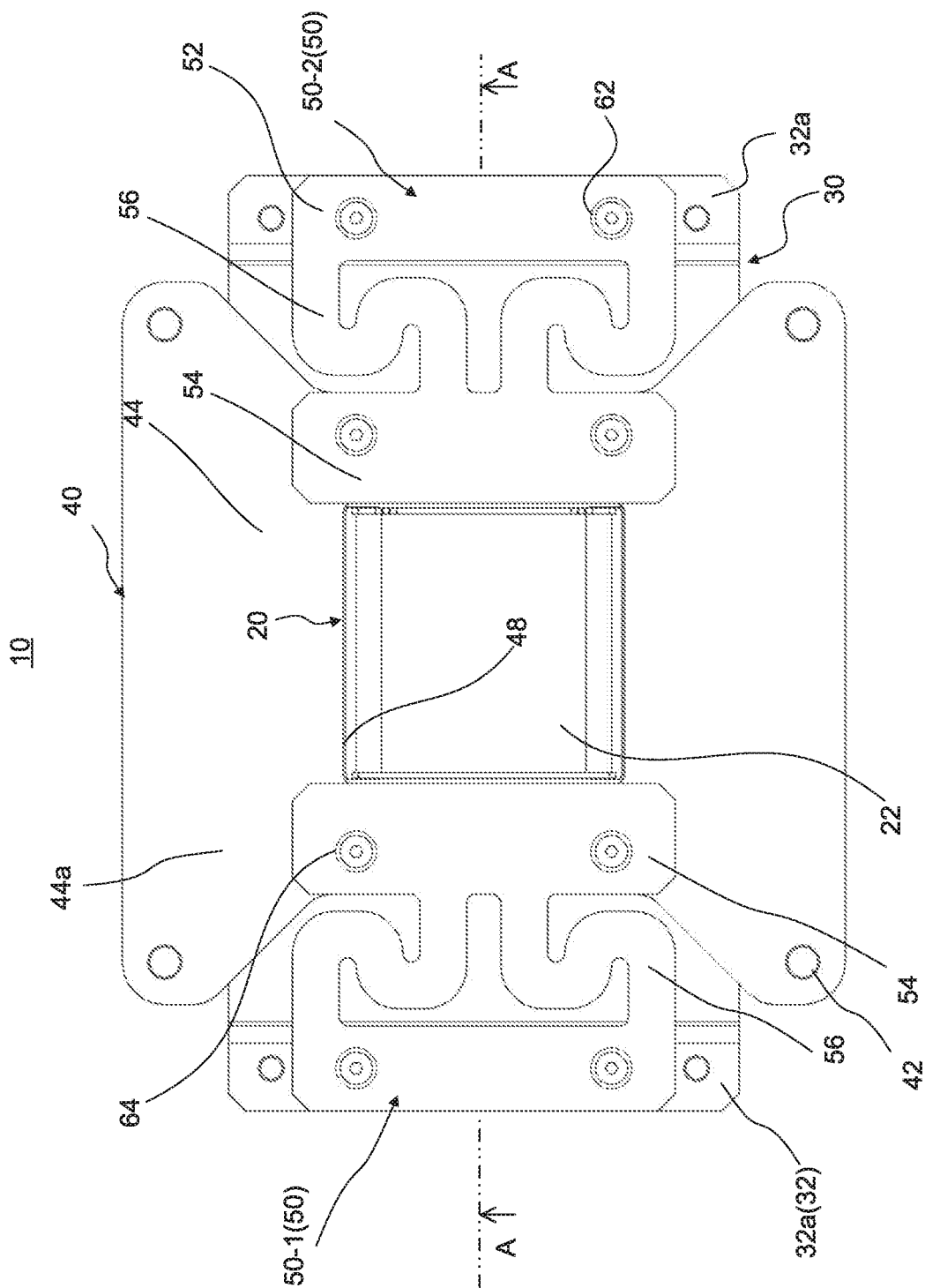
FIG. 3 is a plan view of the vibration actuator according to Embodiment 1 of the present invention.
Figure 4:
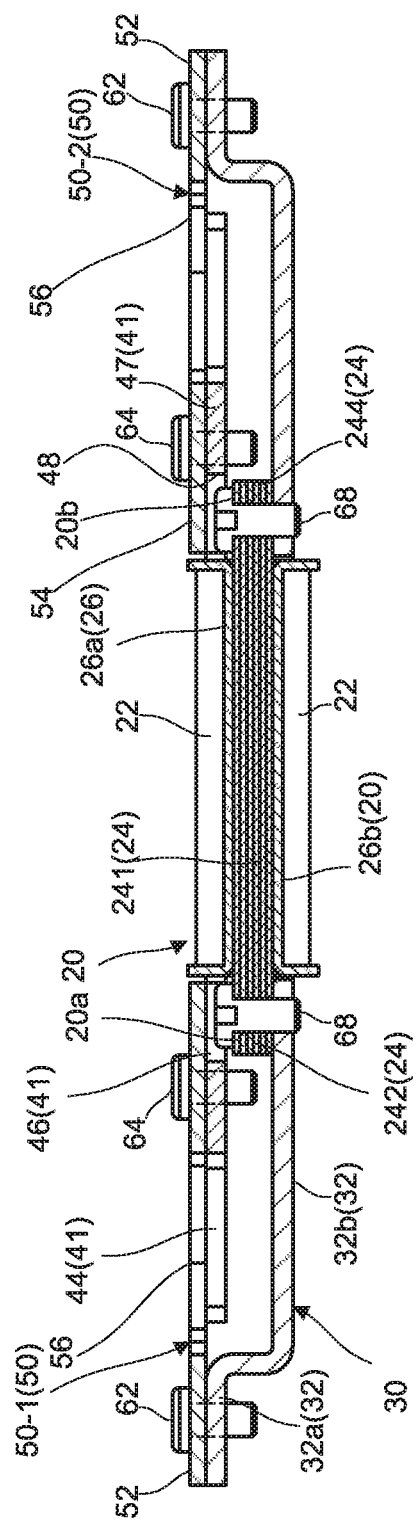
FIG. 4 is a sectional view taken along line A-A in FIG. 3.
Figure 5:
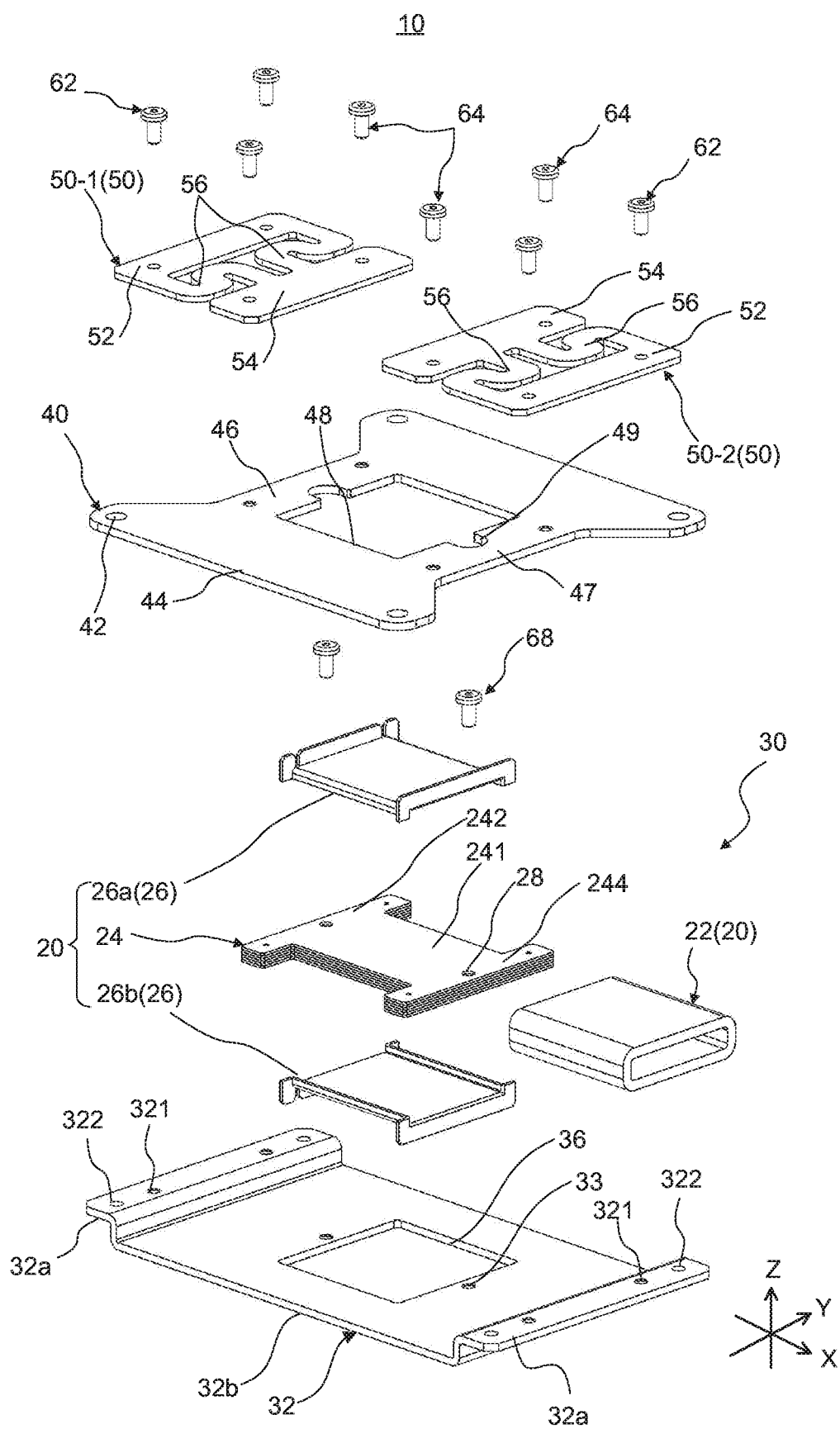
FIG. 5 is an exploded perspective view of the vibration actuator according to Embodiment 1 of the present invention.

FIG. 1 is a plane-side appearance perspective view of a vibration actuator according to Embodiment 1 of the present invention, FIG. 2 is a bottom-surface side appearance perspective view of the vibration actuator according to Embodiment 1 of the present invention, FIG. 3 is a plan view of the vibration actuator according to Embodiment 1 of the present invention, FIG. 4 is a sectional view taken along line A-A in FIG. 3, and FIG. 5 is an exploded perspective view of the vibration actuator according to Embodiment 1 of the present invention.

Vibration actuator 10 illustrated in FIG. 1 to FIG. 5 achieves a vibrating function of an electronic device by being mounted on the electronic device as a vibration generation source of touch panel 140 (see FIG. 17) that is an example of an operation contact surface part.

Vibration actuator 10 in Embodiment 1 is mounted on a touch panel apparatus (see FIG. 17) of a car navigation system as an electronic device and functions as a vibration presenting apparatus that presents vibration to a user of touch panel 140. Note that touch panel apparatus 100 is an example of the vibration presenting apparatus and, in Embodiment 1, includes touch panel 140 as a panel that can be touched by the user via hands, fingers, and the like. Touch panel 140 may be a panel having a display function for displaying images and the like the user can touch or may be a configuration having no display function but simply having an operation contact surface part that can be operated by touch of the user.

Vibration actuator 10 according to Embodiment 1 is mounted on touch panel (operation contact surface part) 140 (see FIG. 17) that displays images, for example. In this case, vibration actuator 10 is a configuration applied to touch panel apparatus 100 that is capable of allowing the user who touches touch panel 140 to perform intuitive operations by transmitting vibration in response to touch operations on the screen to the user to feel bodily sensations. Note that touch panel 140 of touch panel apparatus 100 includes a contact position output part that receives a touch operation of the user on touch panel 140 and outputs the contact position thereof.

Vibration actuator 10 is joined with touch panel 140, receives a driving signal from a control part (not illustrated), generates and drives vibration corresponding to the contact position outputted from touch panel 140 and transmits the vibration to touch panel 140 to directly vibrate touch panel 140.

That is, vibration actuator 10 receives the operation of the user performed on touch panel 140, and is driven accordingly.

Vibration actuator 10 includes: fixing part 30 that includes core assembly 20 formed by winding coil 22 around core 24, and base part 32; movable part 40 that includes magnetic yoke 41; and plate-shaped elastic parts 50 (50-1, 50-2). Plate-shaped elastic parts 50 (50-1, 50-2) elastically support movable part 40 to be movable in vibrating direction with respect to fixing part 30.

Vibration actuator 10 vibrates yoke 41 of movable part 40 with core assembly 20. Specifically, movable part 40 is vibrated with the attraction force of energized coil 22 and core 24 excited by energized coil 22 as well as the urging force by plate-shaped elastic parts 50 (50-1, 50-2).

Vibration actuator 10 is formed in a flat shape having the Z-direction as the thickness direction. Vibration actuator 10 vibrates movable part 40 in the Z-direction with respect to fixing part 30, that is, by having the thickness direction as the vibrating direction to bring closer or away one of top and back surfaces spaced apart from each other in the thickness direction of vibration actuator 10 itself with respect to the other surface in the Z-direction. In Embodiment 1, vibration actuator 10 moves movable part 40 to −Z-direction by the attraction force of core 24, and moves movable part 40 in +Z-direction by the urging force of plate-shaped elastic parts 50 (50-1, 50-2).

In vibration actuator 10 of Embodiment 1, movable part 40 is elastically supported by a plurality of plate-shaped elastic parts 50 (50-1, 50-2) that are disposed along the direction orthogonal to the Z-direction at point symmetrical positions with respect to the moving center of movable part 40. However, the configuration is not limited thereto. Plate-shaped elastic part 50 is fixed between movable part 40 and fixing part 30, includes an elastically deformable bellows-shaped part, and elastically supports movable part 40 in a movable manner with respect to fixing part 30 in the direction opposing to at least one end out of both ends (magnetic pole parts 242, 244) of core 24. With such configuration, how plate-shaped elastic parts 50 are provided is not an issue. For example, plate-shaped elastic part 50 may elastically support movable part 40 with respect to fixing part 30 (core assembly 20) to be movable in the direction opposing to one end (magnetic pole part 242 or magnetic pole part 244) of core 24. Further, plate-shaped elastic parts 50-1, 50-2 may be disposed line symmetrically with respect to the center (moving center) of movable part 40, and two or more plate-shaped elastic parts 50 may be used as well. Each of plate-shaped elastic parts 50-1 and 50-2 is fixed to fixing part 30 at one end side and fixed to movable part 40 at the other end side to movably support movable part 40 with respect to fixing part 30 in the vibrating direction (Z-direction, and it is up-and-down direction herein).

<Fixing Part 30>

As illustrated in FIG. 5, fixing part 30 includes: core assembly 20 including coil 22 and core 24; and base part 32.

Base part 32 has core assembly 20 fixed thereto, is connected to movable part 40 via plate-shaped elastic parts 50 (50-1, 50-2), and supports movable part 40 to be movable in the vibrating direction. Base part 32 is a flat-shape member, and forms the bottom surface of vibration actuator 10. Base part 32 includes attaching parts 32a to which one end of each of plate-shaped elastic parts (50-1, 50-2) is fixed to sandwich core assembly 20. Each of attaching parts 32a is disposed with a same space provided from core assembly 20. Note that the space is a space to be a deforming area of plate-shaped elastic parts 50 (50-1, 50-2).

Attaching part 32a includes fixing holes 321 for fixing plate-shaped elastic parts 50 (50-1, 50-2) and fixing holes 322 for fixing base part 32 to a base material. Fixing holes 322 are provided at both ends of attaching part 32a by sandwiching fixing holes 321. Thereby, base part 32 is fixed to the base member (for example, back surface plate 120 illustrated in FIG. 17) in a fully stable manner.

Base part 32 in Embodiment 1 is formed by processing a sheet metal and configured such that one side part and the other side part as attaching parts 32 are spaced apart from each other in the width direction with bottom surface part 32b interposed therebetween. Between attaching parts 32a, provided is a recessed part having bottom surface part 32b lower in height than that of attaching parts 32a. Inside the recessed part, that is, the space on the top surface side of bottom surface part 32b is for securing the elastic deforming area of plate-shaped elastic parts 50 (50-1, 50-2), and for securing a movable area of movable part 40 supported by plate-shaped elastic parts 50 (50-1, 50-2).

Bottom surface part 32b is a rectangular shape, opening part 36 is formed in the center thereof, and core assembly 20 is located inside opening part 36.

Core assembly 20 is fixed while being partially inserted into opening part 36. Specifically, split body 26b of bobbin 26 on the lower side of core assembly 20 and a lower-side part of coil 22 are inserted inside opening part 36, and core assembly 20 is fixed such that core 24 is located on bottom surface part 32b on a side view. Thereby, length (thickness) in the Z-direction becomes decreased compared to a configuration where core assembly 20 is attached on bottom surface part 32b. Further, because a part of core assembly 20, that is, a part of the bottom surface side herein, is fixed while being fitted into opening part 36, core assembly 20 is firmly fixed in a state where it is hard to come off from bottom surface part 32b.

Opening part 36 is in a shape contoured to the shape of core assembly 20. Opening part 36 in Embodiment 1 is formed in a square shape. Thereby, entire vibration actuator 10 can be shaped substantially into a square shape on a plan view by disposing core assembly 20 and movable part 40 in the center of vibration actuator 10. Note that opening part 36 may be a rectangular shape (including a square shape).

Core assembly 20 vibrates (reciprocal linear motion in the Z-direction) yoke 41 of movable part 40 in cooperation with plate-shaped elastic parts 50 (50-1, 50-2).

Core assembly 20 in Embodiment 1 is formed in a rectangular plate-shaped. Magnetic pole parts 242 and 244 are disposed in both side portions of the rectangular plate-shaped spaced from each other in the longitudinal direction. Magnetic pole parts 242, 244 are disposed to oppose to bottom surfaces of attracted surface parts 46, 47 of movable part 40 with gap G (see FIG. 6) provided therebetween in the X-direction, and counter surfaces (counter surface parts) 20a, 20b as the upper surfaces oppose to the bottom surfaces of attracted surface parts 46, 47 of yoke 41 in the vibrating direction of movable part 40.

Core assembly 20 in Embodiment 1 is formed in a rectangular plate-shaped, and includes magnetic pole parts 242 and 244 at the both side portions spaced from each other in the longitudinal direction. Magnetic pole parts 242 and 244 are disposed to oppose to attracted surface parts 46 and 47 of movable part 40 with gap G provided therebetween in the Z-direction.

As illustrated in FIG. 1 and FIG. 3, core assembly 20 is fixed to base part 32 with a winding axis of coil 22 aligned toward the opposing direction of spaced attaching parts 32a in base part 32.

Core assembly 20 in Embodiment 1 is disposed in the center of base part 32, specifically in the center of bottom surface part 32b.

Core assembly 20 is configured by winding coil 22 around circumference of core 24 via bobbin 26.

As illustrated in FIG. 4, core assembly 20 is fixed to bottom surface part 32b such that core 24 is located on the bottom surface over opening part 36 while being in parallel to bottom surface part 32b. Core assembly 20 is fixed by screw 68 as a fastening member (see FIG. 1, FIG. 3 to FIG. 7) in a state where coil 22 and the part (core main body 241) to which coil 22 is wound are located within opening part 36 of base part 32.

Specifically, core assembly 20 is fixed to bottom surface part 32b by fastening screw 68 via fixing hole 28 and fastening hole 33 (see FIG. 5) of bottom surface part 32b in a state where coil 22 is disposed in opening part 36. Core assembly 20 and bottom surface part 32b are joined at two points on the axial center of coil 22 by sandwiching coil 22 with both side parts of opening part 36 spaced from each other in the X-direction and magnetic pole parts 242, 244 via screws 68.

Coil 22 is a solenoid that is energized and generates a magnetic field at the time of driving vibration actuator 10. Coil 22 together with core 24 and movable part 40 forms a magnetic circuit (magnetic path) that attracts and moves movable part 40. Note that power is supplied to coil 22 from an external power source via a control part, not illustrated. For example, through supplying a driving signal to the control part, the power is supplied to coil 22 to drive vibration actuator 10.

Core 24 includes: core main body 241 around which coil 22 is wound; and magnetic pole parts 242, 244 provided at both ends of core main body 241 excited by energizing coil 22.

Core 24 may be in any types of configuration as long as it is a configuration having the length with which the both ends can function as magnetic pole parts 242, 244 when coil 22 is energized. For example, while it is possible to employ a straight-type (I-type) tabular shape, core 24 of Embodiment 1 is formed in an H-type tabular shape on a plan view.

When formed as an I-type core, the area of surfaces (gap side surface) on attracted surface parts 46, 47 side opposing to the both ends (magnetic pole parts) of the I-type core with gap (air gap) G provided therebetween becomes narrower. Thereby, magnetic resistance in the magnetic circuit may be increased, so that the conversion efficiency may be deteriorated. Further, there may be no space for positioning of the bobbins or may only be a small space in the longitudinal direction of the core for attaching the bobbins to the core, so that it is necessary to provide the space for positioning separately. In the meantime, because core 24 is the H-type, the gap side surface in the both ends of core main body 241 can be expanded in the front-and-rear directions (Y-directions) longer than the width of core main body 241 around which coil 22 is wound, thereby making it possible to decrease the magnetic resistance and improve the efficiency of the magnetic circuit. Further, positioning of coil 22 can be performed by simply fitting bobbins 26 between portions of magnetic pole parts 242, 244 extended out from core main body 241, so that it is unnecessary to separately provide a positioning member of bobbins 26 for core 24.

In core 24, magnetic pole parts 242 and 244 are provided at each of the both ends of tabular core main body 241 around which coil 22 is wound by being projected toward the direction orthogonal to the winding axis of coil 22.

Core 24 is of a magnetic material, and formed from a silicon steel sheet, permalloy, ferrite, or the like. Further, core 24 may also be made of electromagnetic stainless steel, a sintered material, an MIM (metal injection mold) material, a laminated steel sheet, an electrogalvanized steel sheet (SECC), or the like.

Each of magnetic pole parts 242 and 244 is provided by being projected in the Y-direction from both opening parts of coil 22.

Magnetic pole parts 242 and 244 are excited by energizing coil 22, attracts and moves yokes 41 of movable part 40 spaced in the vibrating direction (Z-direction). Specifically, magnetic pole parts 242 and 244 attract, by a magnetic flux to be generated, attracted surface parts 46 and 47 of movable part 40 counter-disposed via gap G.

Magnetic pole parts 242 and 244 are tabular bodies extended in the Y-direction that is the vertical direction with respect to core main body 241 extended in the X-direction. Magnetic pole parts 242 and 244 are lengthy in the Y-direction, so that the area of counter surfaces 20a and 20b opposing to yokes 41 are wider than the configuration formed in the both ends of core main body 241.

Magnetic pole parts 242 and 244 have fixing holes 28 formed in the center thereof in the Y-direction, and are fixed to base part 32 by screws 68 inserted into fixing holes 28.

Bobbin 26 is disposed to surround core main body 241 of core 24. Bobbin 26 is formed from a resin material, for example. This makes it possible to secure electrical insulation with other metallic members (for example, core 24), so that reliability as the electric circuit can be improved. By using a resin of high fluidity for the resin material, formability can be improved so that the thickness can be decreased while securing the strength of bobbin 26. Through mounting split bodies 26a and 26b to sandwich core main body 241, bobbin 26 is formed in a cylindrical shape that covers the periphery of core main body 241. In bobbin 26, a flange is provided to the both ends of the cylindrical body to regulate so that coil 22 comes to be located on the outer circumference of core main body 241.

<Movable Part 40>

Movable part 40 is disposed to oppose to core assembly 20 with gap G provided therebetween in the direction orthogonal to the vibrating direction (Z-direction). Movable part 40 is provided to be able to reciprocally vibrate in the vibrating direction with respect to core assembly 20.

Movable part 40 includes yokes 41, and includes movable-body side fixing parts 54 of plate-shaped elastic parts 50-1 and 50-2 fixed to yokes 41.

Movable part 40 is disposed by being hanged while being spaced substantially in parallel and to be movable in the approaching/leaving directions (Z-directions) with respect to bottom surface part 32b via plate-shaped elastic parts 50 (50-1, 50-2).

Yoke 41 is a tabular body made of a magnetic material such as electromagnetic stainless steel, a sintered material, an MIM (metal injection mold) material, a laminated steel sheet, an electrogalvanized steel sheet (SECC), or the like. Yoke 41 in Embodiment 1 is formed by processing an SECC sheet.

Yokes 41 are hanged to oppose to core assembly 20 with gap G (see FIG. 6) provided therebetween in the vibrating direction (Z-direction) by plate-shaped elastic parts 50 (50-1, 50-2) fixed to respective attracted surface parts 46 and 47 spaced from each other in the X-direction.

Yoke 41 includes: surface-part fixing part 44 to which an operation contact surface part (see touch panel 140 illustrated in FIG. 17) is attached; and attracted surface parts 46 and 47 counter-disposed with respect to magnetic pole parts 242 and 244.

Yoke 41 in Embodiment 1 includes opening part (fixing-part side opening part) 48 in the center thereof. Yoke 41 has a rectangular frame shape. Yoke 41 is formed in a frame shape that surrounds opening part 48 with surface-part fixing part 44 and attracted surface parts 46, 47.

Opening part 48 opposes to coil 22. In Embodiment 1, opening part 48 is located right above coil 22, and the opening shape of opening part 48 is formed in a shape to which coil 22 part of core assembly 20 can be inserted when yoke 41 moves to bottom surface part 32b side.

By configuring yoke 41 to have opening part 48, the thickness of the entire vibration actuator can be decreased compared to a case having no opening part 48.

Further, core assembly 20 is located within opening part 48, so that yoke 41 is not disposed in the vicinity of coil 22. Therefore, it is possible to suppress deterioration in the conversion efficiency due to the magnetic flux leaked from coil 22, so that high output can be achieved.

Surface-part fixing part 44 includes fixing surface 44a that comes in surface-contact to fix touch panel 140 as an example of the operation contact surface part. Fixing surface 44a forms a trapezoid shape on a plan view, and surface-contacts with touch panel 140 that is fixed to surface-part fixing part 44 via fastening member such as a screw inserted into surface-part fixing hole 42.

Attracted surface parts 46, 47 are attracted to magnetized magnetic pole parts 242, 244 in core assembly 20, and plate-shaped elastic parts 50 (50-1, 50-2) are fixed thereto.

Movable-body side fixing parts 54 of plate-shaped elastic parts 50-1 and 50-2 are fixed by being laminated, respectively, on attracted surface parts 46 and 47. Attracted surface parts 46 and 47 are provided with notches 49 functioning as clearance of the heads of screws 64 of core assembly 20 when moved to bottom surface part 32b side.

Thereby, even when movable part 40 moves to bottom surface part 32b side and attracted surface parts 46, 47 approach magnetic pole parts 242, 244, magnetic pole parts 242, 244 are not to be in contact with screws 68 that fix magnetic pole parts 242, 244 to bottom surface part 32b, so that a movable area of yoke 41 in the Z-direction can be secured for that.

<Plate-Shaped Elastic Parts 50 (50-1, 50-2)>

Plate-shaped elastic parts 50 (50-1, 50-2) support movable part 40 to be movable with respect to fixing part 30. Plate-shaped elastic parts 50 (50-1, 50-2) support the upper surface of movable part 40 to be the same height as that of the upper surface of fixing part 30 or to be on a lower surface side than the upper surface of fixing part 30 (upper surface of core assembly 20 in Embodiment 1) to be in parallel to each other. Note that plate-shaped elastic parts 50-1, 50-2 have symmetrical shapes with respect to the center of movable part 40 and, in Embodiment 1, are members formed in the same manner.

Plate-shaped elastic parts 50 are disposed such that yoke 41 is substantially in parallel to oppose to magnetic pole parts 242, 244 of core 24 of fixing part 30 with gap G provided therebetween. Plate-shaped elastic parts 50 support the lower surface of movable part 40 to be movable in the vibrating direction at a position closer to bottom surface part 32b side than the level substantially the same as the height level of the upper surface of core assembly 20.

Plate-shaped elastic part 50 is a plate spring including fixing-body side fixing part 52, movable-body side fixing part 54, and bellows-like elastic arm part 56 that communicates fixing-body side fixing part 52 with movable-body side fixing part 54.

Plate-shaped elastic parts 50 attaches movable part 40 while attaching fixing-body side fixing part 52 to the top surface of attaching part 32a, attaching movable-body side fixing part 54 to the top surface of attracted surface parts 46, 47 of yoke 41, and having bellows-like elastic arm part 56 in parallel to bottom surface part 32b.

Fixing-body side fixing part 52 surface-contacts with attaching part 32a by being joined and fixed by screws 62, and movable-body side fixing part 54 surface-contacts with attracted surface parts 46, 47 by being joined and fixed by screws 64.

Bellows-like elastic arm part 56 is an arm part having a bellows-shaped part. By having the bellows-shaped part, bellows-like elastic arm part 56 secures the length that allows deformation required for vibration of movable part 40 between fixing-body side fixing part 52 and movable-body side fixing part 54 and also on the surface orthogonal to the vibrating direction (surface formed in the X-direction and the Y-direction).

Bellows-like elastic arm part 56 in Embodiment 1 extends in the opposing direction of fixing-body side fixing part 52 and movable-body side fixing part 54 and folds back, and the ends that are joined, respectively, to fixing-body side fixing part 52 and movable-body side fixing part 54 are formed at positions shifted in the Y-direction.

Bellows-like elastic arm parts 56 are disposed at point-symmetrical or line-symmetrical positions with respect to the center of movable part 40.

Thereby, movable part 40 is supported from both sides by bellows-like elastic arm parts 56 having bellows-shaped springs, so that it is possible to disperse the stress at the time of elastic deformation. That is, plate-shaped elastic parts 50 can move movable part 40 in the vibrating direction (Z-direction) without tilting with respect to core assembly 20, thereby making it possible to improve reliability of the vibrating state.

Each of plate-shaped elastic parts 50 includes at least two or more bellows-like elastic arm parts 56. Thereby, compared to a case where there is only one each of bellows-like elastic arm part 56, it is possible to improve the reliability of the vibrating state by dispersing the stress at the time of elastic deformation and to improve the stability because the support for movable part 40 can be well-balanced.

The plate spring as plate-shaped elastic part 50 in Embodiment 1 is formed from a magnetic material. Further, movable-body side fixing parts 54 of plate-shaped elastic parts 50 are disposed at positions opposing to both ends (magnetic pole parts 242, 244) of core 24 in the coil winding axis direction or on the upper side thereof and function as a magnetic path. In Embodiment 1, movable-body side fixing parts 54 are fixed by being laminated on the upper side of attracted surface parts 46 and 47. This makes it possible to increase thickness H (see FIG. 6) of attracted surface parts 46 and 47 opposing to magnetic pole parts 242, 244 of core assembly 20 as the thickness of the magnetic material. The thickness of plate-shaped elastic parts 50 and the thickness of yoke 41 are the same, so that the cross sectional area of the magnetic material portion opposing to magnetic pole parts 242, 244 can be doubled. This makes it possible to expand the magnetic circuit, to ease the deterioration in the property of the magnetic circuit due to magnetic saturation, and to improve the output compared to a case where the plate spring is nonmagnetic.

Note that vibration actuator 10 of Embodiment 1 may be provided with a detection part that detects push-in amount of movable part 40 when the operation surface part fixed by surface-part fixing part 44 is operated.

Figure 6:
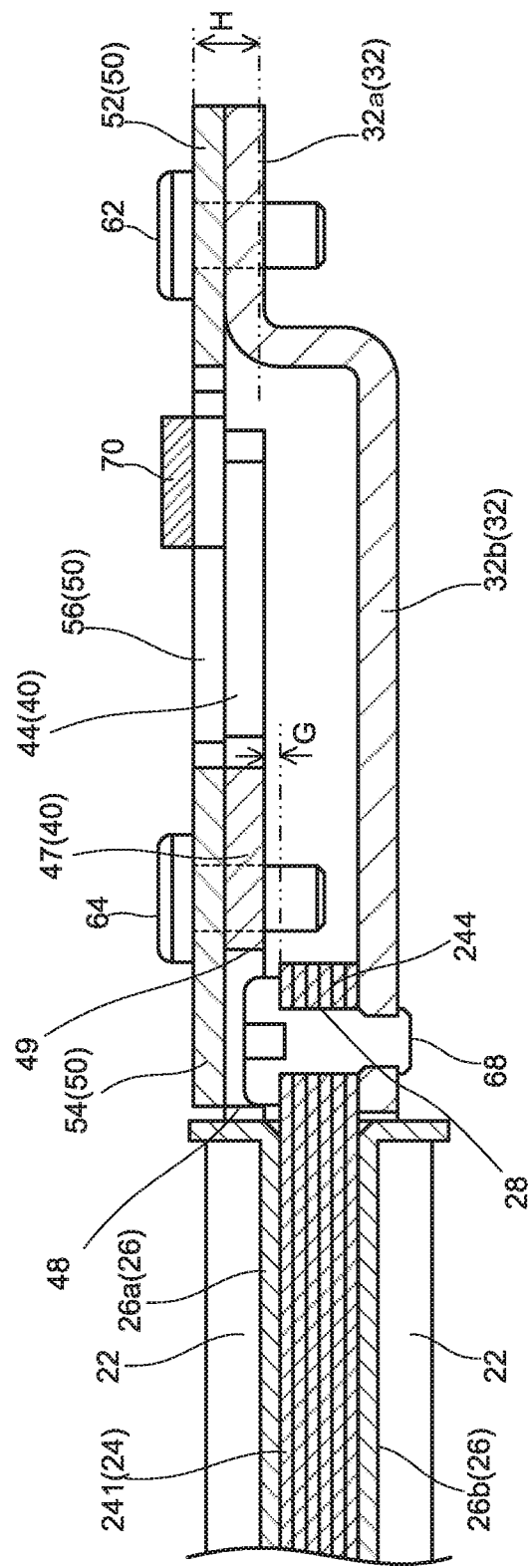
FIG. 6 is a sectional view illustrating a state where a sensor is provided to the vibration actuator according to Embodiment 1 of the present invention.

For example, as illustrated in FIG. 6, strain detection sensor 70 that detects strain of plate-shaped elastic parts 50 may be provided as a detection part.

Strain detection sensor 70 detects strain of plate-shaped elastic parts 50 that are deformed when surface-part fixing part 44 is pushed into bottom surface part 32b side. Detected strain is outputted to the control part and the like, coil 22 is energized to attract and move yoke 41 such that movable part 40 moves in an amount corresponding to the strain.

Embodiment 1 can function without determining the moving amount of the operation contact surface part to be operated, as long as contact to the operation contact surface part can be detected. Further, a more natural sense of touch can be expressed when the push-in amount with respect to plate-shaped elastic parts 50 can be detected with the moving amount corresponding to the actual moving amount on the operation contact surface part.

Strain detection sensor 70 is attached between heads of screws 62 and 64 on bellows-like elastic arm parts 56 of plate-shaped elastic parts 50, and disposed in the so-called dead space that is an area not obstructing other members.

Figure 7:
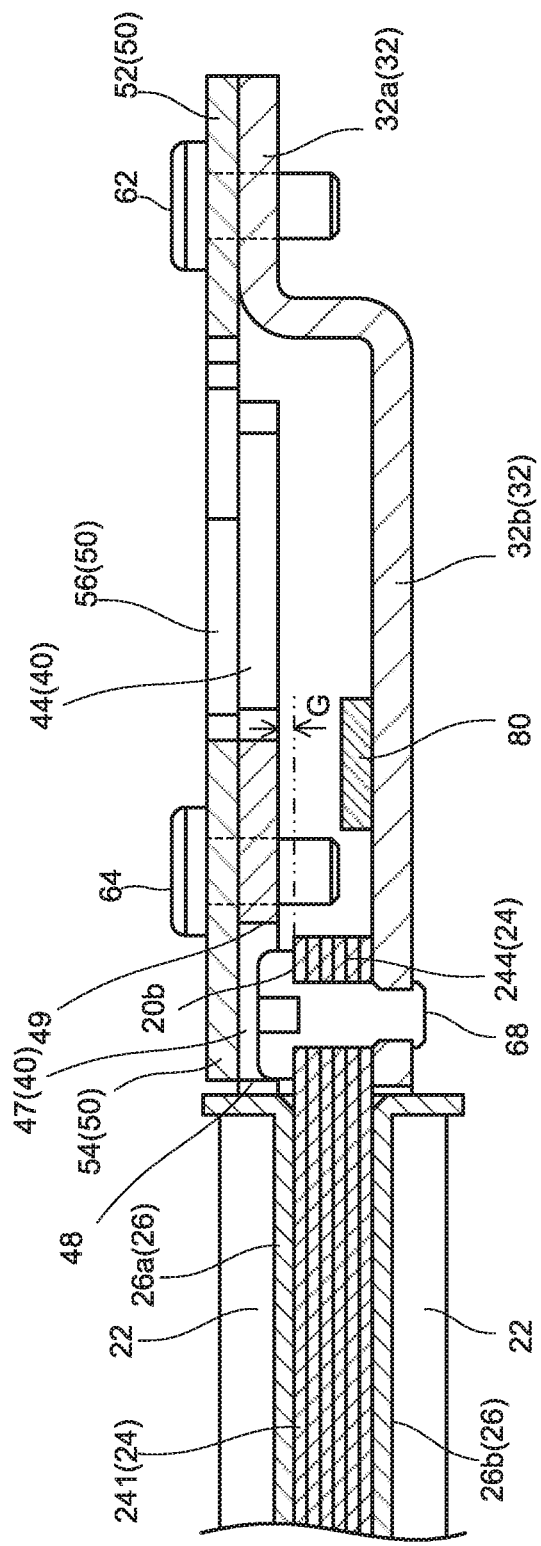
FIG. 7 is a sectional view illustrating a state where a sensor is provided to the vibration actuator according to Embodiment 1 of the present invention.

Further, as illustrated in FIG. 7, it is also possible to dispose the detection part for detecting push-in in a lower part of plate-shaped elastic parts 50 as the dead space. In that case, the detection sensor is electrostatic capacitance sensor 80 for detecting the push-in amount and disposed on bottom surface part 32b opposing to plate-shaped elastic parts 50. The distance with respect to plate-shaped elastic parts 50 displaced by being pushed in is measured. Thereby, the distance when deformed by following the push-in on the operation contact surface part can be measured. With such method using the electrostatic capacitance, it is possible to detect fluctuation in plate-shaped elastic parts 50 or movable part 40 on the lower side of plate-shaped elastic parts 50. In addition, it is also possible to achieve detection of the push-in amount of the operation contact surface part and to generate vibration of movable part 40 by corresponding to the push-in amount while maintaining the external dimension of vibration actuator 10.

Figure 8:
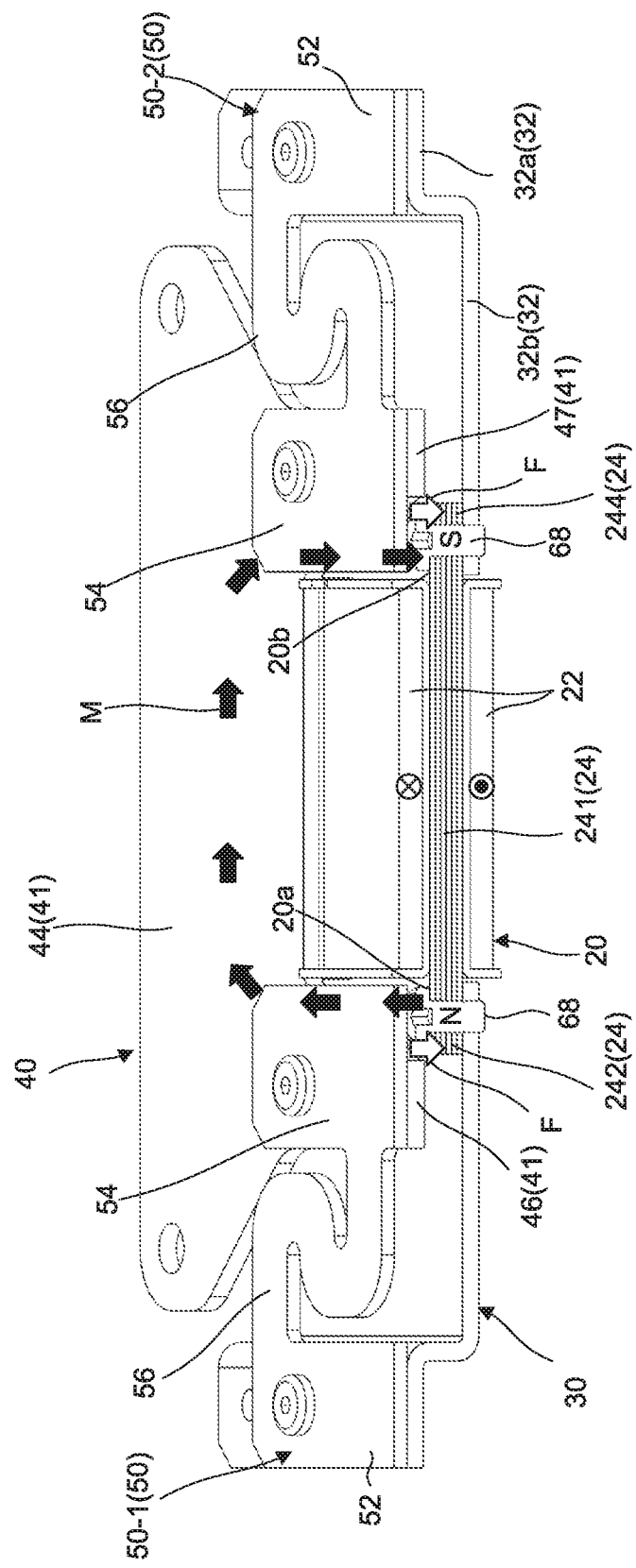
FIG. 8 is a diagram illustrating a magnetic circuit configuration of the vibration actuator according to Embodiment 1 of the present invention.

FIG. 8 is a diagram illustrating the magnetic circuit of vibration actuator 10. Note that FIG. 8 is a perspective view of vibration actuator 10 cut along line A-A of FIG. 3 and, in the magnetic circuit, there are also magnetic flux flows M similar to the illustration thereof existing in the part having no such illustration. Further, FIG. 9 are sectional views schematically illustrating move of movable part 40 caused by the magnetic circuit. FIG. 9A is a diagram illustrating a state where movable part 40 is held by plate-shaped elastic parts 50 at a position spaced from core assembly 20, and FIG. 9B illustrates movable part 40 attracted and moved toward core assembly 20 side by a magneto motive force generated by the magnetic circuit.

Specifically, when coil 22 is energized, core 24 is excited and a magnetic field is generated, thereby forming magnetic poles in both ends of core 24. For example, as illustrated in FIG. 8, in core 24, magnetic pole part 242 is the N-pole, and magnetic pole part 244 is the S-pole. Thereby, the magnetic circuit indicated by magnetic flux flow M is formed between core assembly 20 and yoke 41. Magnetic flux flow M in the magnetic circuit flows to attracted surface part 46 of opposing yoke 41 from magnetic pole part 242, passes through surface-part fixing part 44 of yoke 41, and reaches magnetic pole part 244 opposing to attracted surface part 47 from attracted surface part 47. In Embodiment 1, plate-shaped elastic parts 50 are also of magnetic materials. Thereby, the magnetic flux (illustrated as magnetic flux flow M) flown to attracted surface part 46 passes through attracted surface part 46 of yoke 41 and movable-body side fixing part 54 of plate-shaped elastic parts 50-1, reaching attracted surface part 47 and both ends of movable-body side fixing part 54 of plate-shaped elastic part 50-2 via surface-part fixing part 44 from both ends of attracted surface part 46.

Thereby, according to the principle of electromagnetic solenoid, magnetic pole parts 242, 244 of core assembly 20 generate attraction force F for attracting attracted surface parts 46, 47 of yoke 41. Thereupon, attracted surface parts 46, 47 of yoke 41 are attracted to both of magnetic pole parts 242, 244 of core assembly 20, coil 22 is inserted into opening part 48 of yoke 41, and movable part 40 including yoke 41 moves in F-direction against the urging force of plate-shaped elastic parts 50 (see FIG. 9A and FIG. 9B).

In the meantime, when energization to coil 22 is stopped, the magnetic field disappears, attraction force F of core assembly 20 for movable part 40 is lost, and movable part 40 is moved back to the original position (moved to −F-direction) by the urging force of plate-shaped elastic parts 50.

By repeating such action described above, in vibration actuator 10, movable part 40 reciprocally moves and generates vibration in the vibrating direction (Z-direction).

In vibration actuator 10, it is possible to increase the efficiency of the magnetic circuit and achieve high output by disposing attracted surface parts 46, 47 of yoke 41 adjacent to magnetic pole parts 242, 244 of core assembly 20. Further, vibration actuator 10 uses no magnet, so that a low-cost configuration can be achieved. The bellows-shaped springs that are plate-shaped elastic parts 50 (50-1, 50-2) enable dispersion of the stress, so that the reliability can be improved. Especially, because movable part 40 is supported by a plurality of plate-shaped elastic parts 50 (50-1, 50-2), more effective dispersion of the stress is possible. As described, vibration actuator 10 is capable of providing a more direct sense of touch by the drive of up-and-down direction.

By fixing core 24 around which coil 22 is wound and core assembly 20 to fixing part 30, movable part 40 is supported to be movable. Thereby, it becomes unnecessary to provide a magnetic generating part in the Z-direction, and design becomes simple because the supporting structure is simple. Thus, space can be saved, so that it is possible to decrease the thickness of vibration actuator 10.

Hereinafter, the driving principle of vibration actuator 10 will simply be described. Note that it is the same for vibration actuators 10A, 10B of Modification Examples 1, 2 to be described later, and vibration actuators 10, 10A, 10B can be driven by generating a resonance phenomenon with a pulse by using following motion equation and circuit equation. The actions are not resonance driven but for expressing operational feeling of mechanical switches displayed on the operation contact surface part, and it is also possible to drive the vibration actuator by generating any types of vibration without using a short pulse while the vibration actuator in Embodiment 1 is driven by inputting a short pulse via a control part, not illustrated. Examples of the mechanical switch may be a tactile switch, alternate-type switch, a momentary switch, a toggle switch, a slide switch, a rotary switch, a DIP switch, and a rocker switch.

Note that movable part 40 in vibration actuator 10 performs reciprocal motions based on Expressions (1) and (2).

[Expression 1]

$$m\frac{d^2x(t)}{dt^2} = K_f i(t) - K_{sp} x(t) - D\frac{dx(t)}{dt} \quad (1)$$

$m$: Mass [kg]

$x(t)$: Displacement [m]

$K_f$: Thrust constant [N/A]

$i(t)$: Current [A]

$K_{sp}$: Spring constant [N/m]

$D$: Damping coefficient [N/(m/s)]

[Expression 2]

$$e(t) = Ri(t) + L\frac{di(t)}{dt} + K_e \frac{dx(t)}{dt} \quad (2)$$

$e(t)$: Voltage [V]

$R$: Resistance [Ω]

$L$: Inductance [H]

$K_e$: Counter electromotive force constant [V/(rad/s)]

That is, mass "m" [kg], displacement "x(t)" [m], thrust constant "$K_f$" [N/A], current "i(t)" [A], spring constant "$K_{sp}$" [N/m], and damping coefficient "D" [N/(m/s)] in vibration actuator 10 can be changed as appropriate within the range satisfying Expression (1). Also, voltage "e(t)" [V], resistance "R" [Ω], inductance "L" [H], and counter electromotive force constant "$K_e$" [V/(rad/s)] can be changed as appropriate within the range satisfying Expression (2).

As described, the drive of vibration actuator 10 is determined based on mass "m" of movable part 40, and spring constant $K_{sp}$ of metal springs as plate-shaped elastic parts 50 (elastic bodies; plate springs in Embodiment 1).

Further, in vibration actuator 10, screws 62 and 64 are used for fixing base part 32 and plate-shaped elastic parts 50 and for fixing plate-shaped elastic parts 50 and movable part 40. Thereby, plate-shaped elastic parts 50 required to be firmly fixed to fixing part 30 and movable part 40 for allowing movable part 40 to drive can be firmly fixed mechanically in a state capable of reworking.

Vibration actuator 10 includes fixing part 30 that includes: coil 22; and core 24 around which coil 22 is wound and both ends thereof are projected from coil 22. Further, vibration actuator 10 includes movable part 40 that: includes yokes 41, 41A formed from a magnetic material and disposed adjacently opposite to counter surfaces 20a, 20b of magnetic pole parts 242, 244 as the both ends of core 24 with gap G provided therebetween in the direction crossing with the winding axis of coil 22; and is capable of being fixed to the operation contact surface part that is operated by contact. Vibration actuator 10 includes plate-shaped elastic parts 50 that: are fixed between movable part 40 and fixing part 30; and include bellows-like elastic arm parts 56 that are elastically deformed to elastically support movable part 40 with respect to fixing part 30 to be movable in the direction opposing to magnetic pole parts 242, 244. While it is preferable that a plurality of plate-shaped elastic parts 50 be fixed at symmetrical positions with respect to the center of movable part 40, movable part 40 may also be support by one plate-shaped elastic part 50 to be vibratable with respect to fixing part 30 as described above. Plate-shaped elastic part 50 may include at least two or more arm parts that connect movable part 40 and fixing part 30, and include bellows-like elastic arm part 56. Plate-shaped elastic part 50 may be made of a magnetic material. In that case, each of movable-body side fixing parts (movable-body side attachment parts) 54 of plate-shaped elastic parts 50 is disposed in the winding axis direction of coil 22 or the direction orthogonal to the winding axis direction with respect to the both ends of core 24, and forms a magnetic path together with core 24 when coil 22 is energized.

Thereby, even when attached to a touch panel that is the operation contact surface part, it is possible to give a preferable operational feeling to the user at the time of operating the touch panel while achieving reduction in the thickness and the cost.

Modification Example 1

Figure 10:
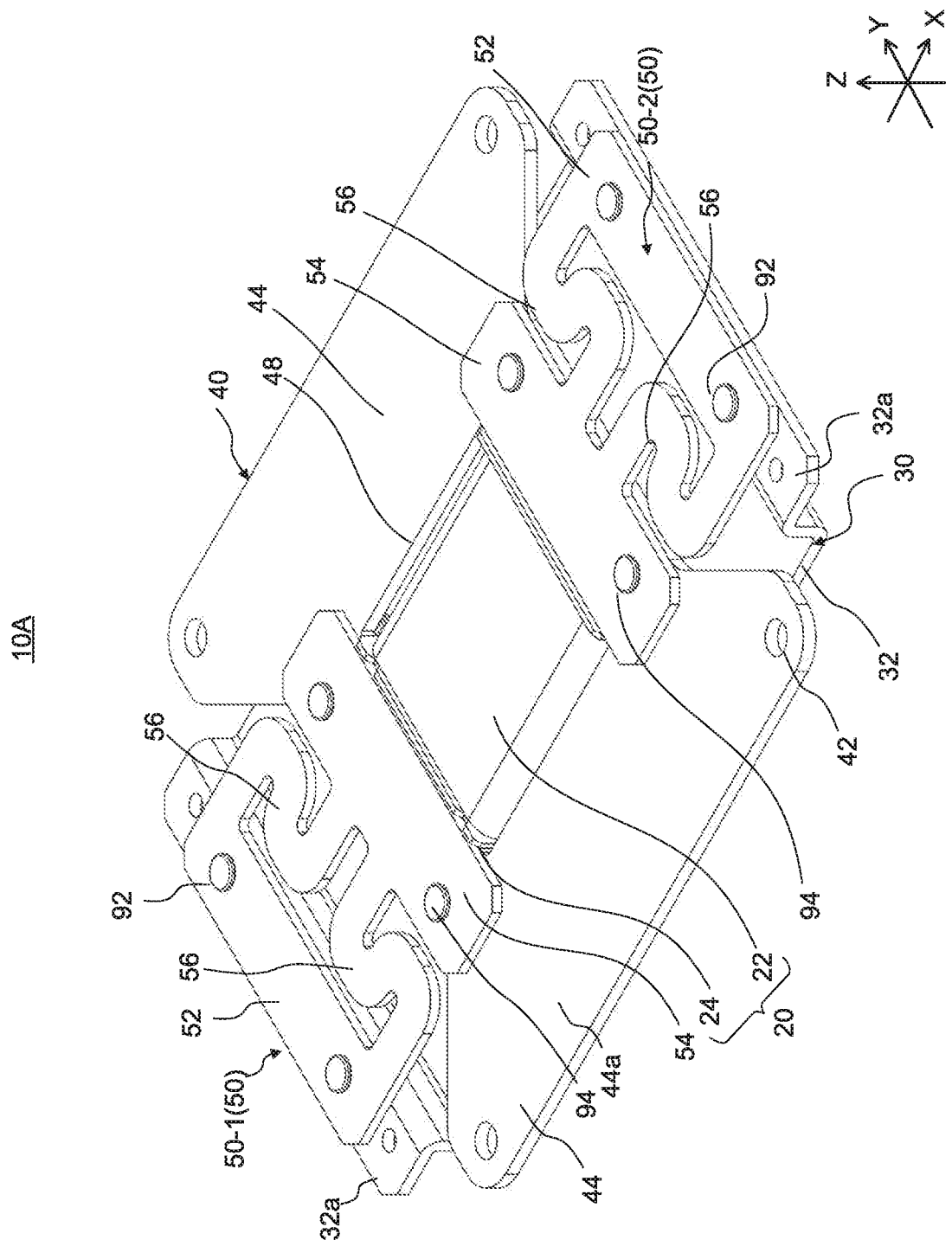
FIG. 10 is a plane-side appearance perspective view of Modification Example 1 of the vibration actuator.
Figure 11:
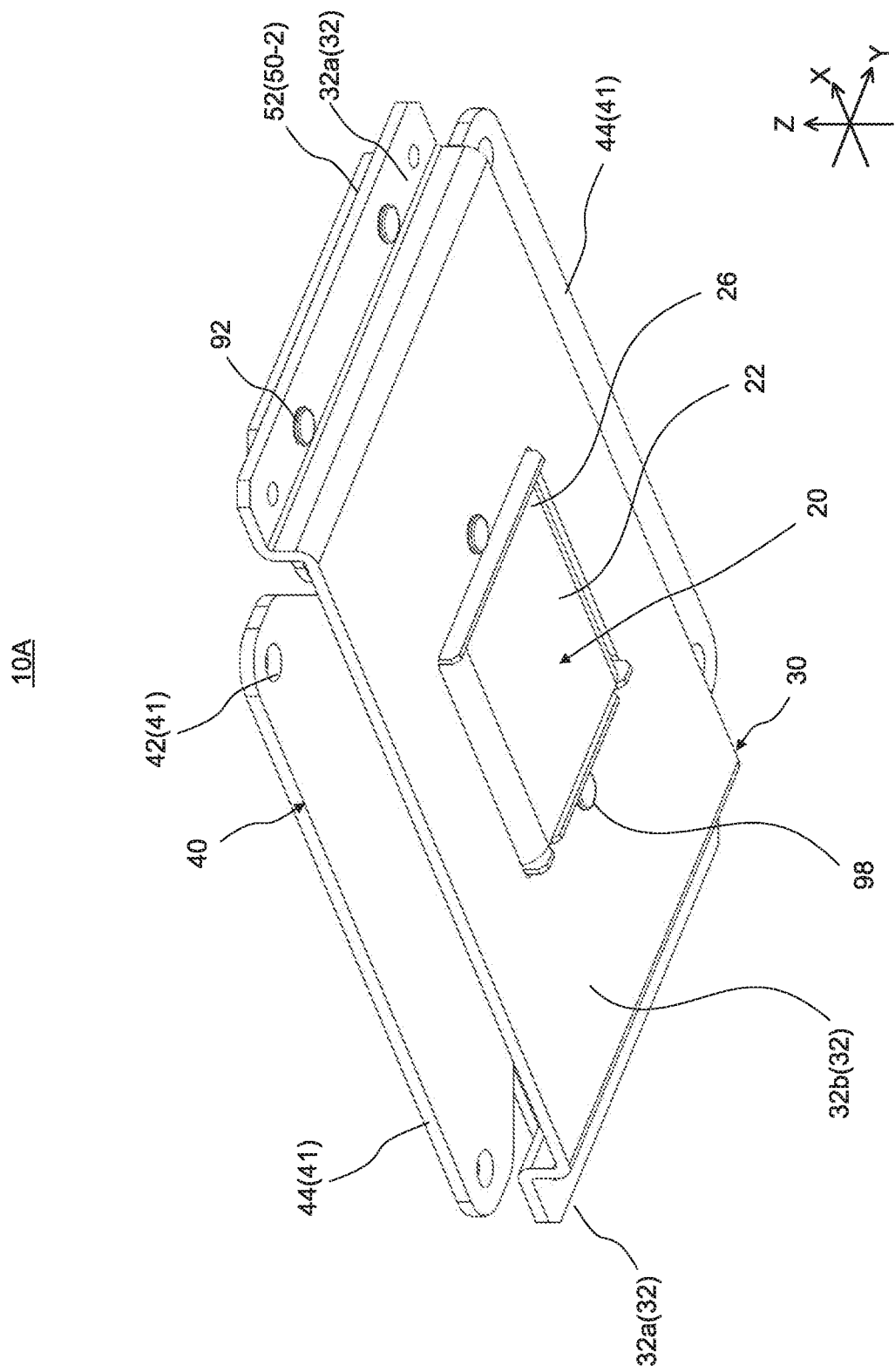
FIG. 11 is a bottom-surface side appearance perspective view of Modification Example 1 of the vibration actuator.
Figure 12:
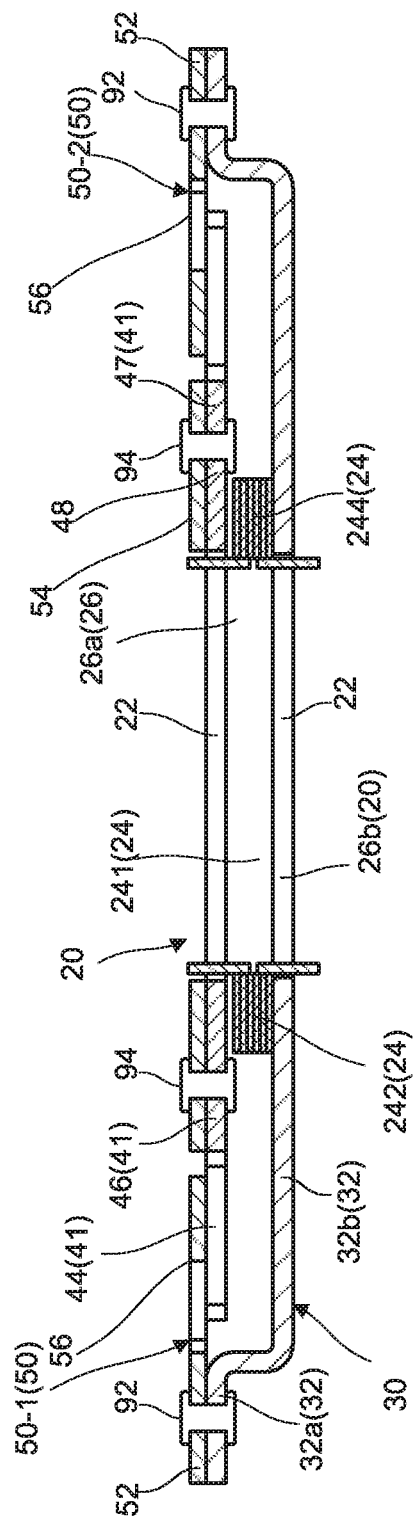
FIG. 12 is a sectional view illustrating a configuration of main components of Modification Example 1 of the vibration actuator.
Figure 13:
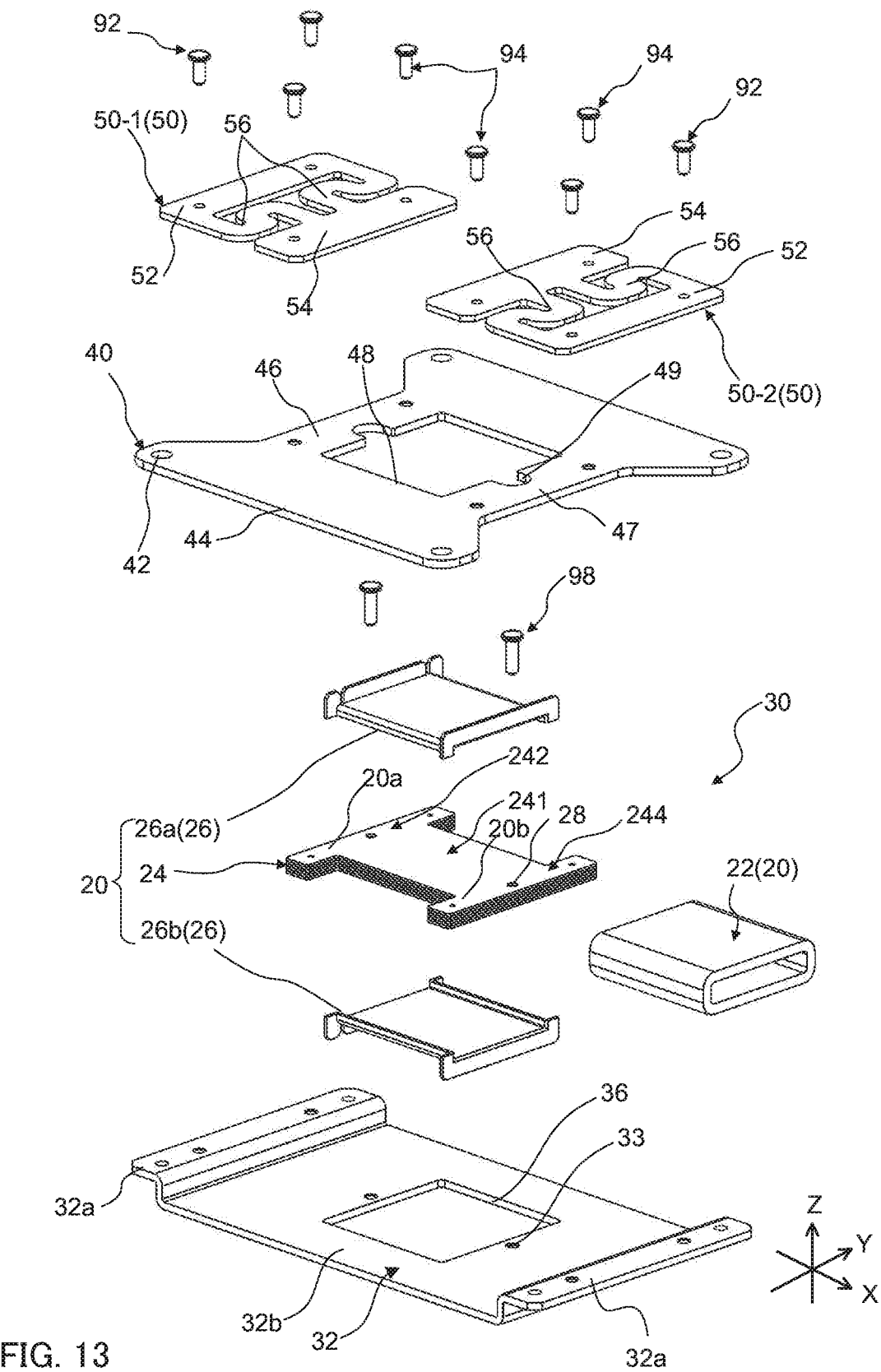
FIG. 13 is an exploded perspective view of Modification Example 1 of the vibration actuator.

FIG. 10 is a plane-side appearance perspective view of Modification Example 1 of the vibration actuator, and FIG. 11 is a bottom-surface side appearance perspective view of Modification Example 1 of the vibration actuator. FIG. 12 is a sectional view illustrating a configuration of main components of Modification Example 1 of the vibration actuator, and FIG. 13 is an exploded perspective view of Modification Example 1 of the vibration actuator.

In vibration actuator 10A illustrated in FIG. 10 to FIG. 13, screws 62, 64, and 68 used in the configuration of vibration actuator 10 for fixing base part 32 and plate-shaped elastic parts 50 and for fixing plate-shaped elastic parts 50 and movable part 40, respectively, are changed. Specifically, vibration actuator 10A is configured by using rivets 92, 94, and 98 instead of screws 62, 64, and 68. Each of rivets 92, 94, and 98 is formed with a head and a body without a threaded part, which is inserted into a bored member, and an end on the opposite side is riveted and plastically deformed to join the bored members with each other. The riveting may be performed by a pressing machine or a special tool, for example.

Rivets 92 fix attaching part 32a of fixing part 30 and plate-shaped elastic parts 50, and rivets 94 fix plate-shaped elastic parts 50 and yoke 41. Further, rivets 98 fix fixing part 30 to bottom surface part 32b in a state where coil 22 of core assembly 20 is disposed in fastening hole 33 of bottom surface part 32b. Thereby, plate-shaped elastic parts 50 can be more firmly fixed than the case of using screw 62, 64, and 68, so that plate-shaped elastic parts 50 can be stably fixed to fixing part 30 and movable part 40.

Modification Example 2

Figure 14:
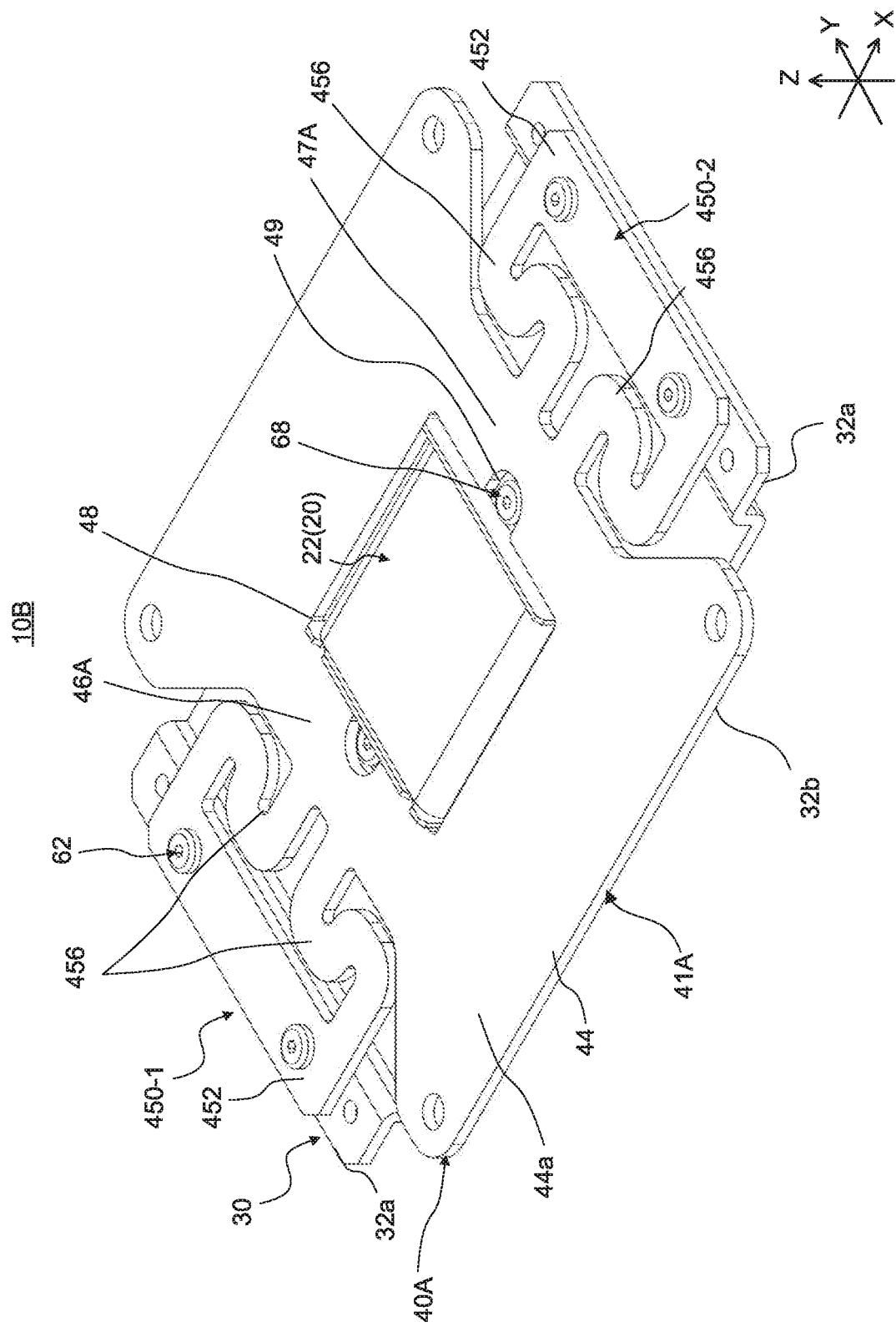
FIG. 14 is a plane-side appearance perspective view of Modification Example 2 of the vibration actuator.
Figure 15:
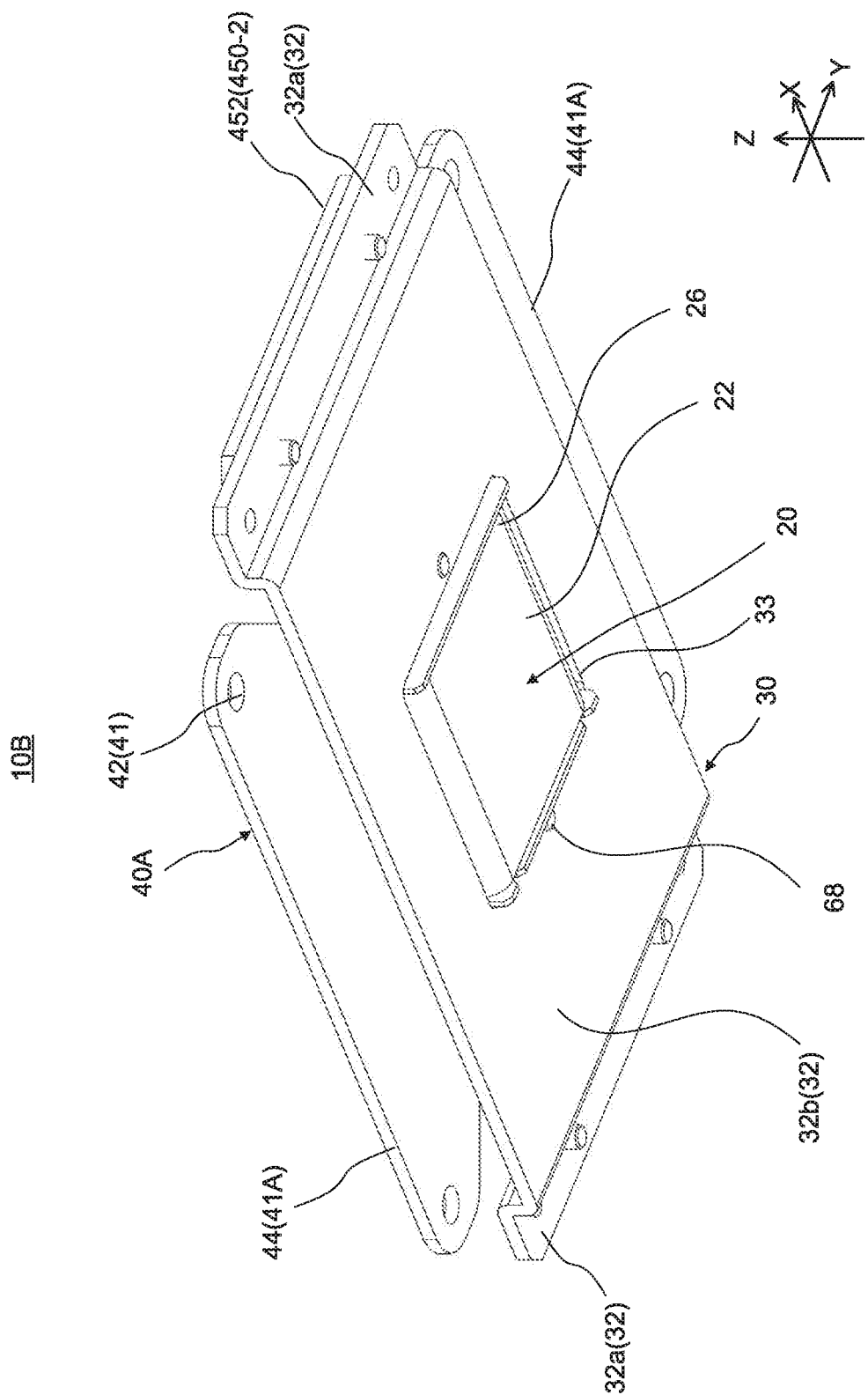
FIG. 15 is a bottom-surface side appearance perspective view of Modification Example 2 of the vibration actuator.
Figure 16:
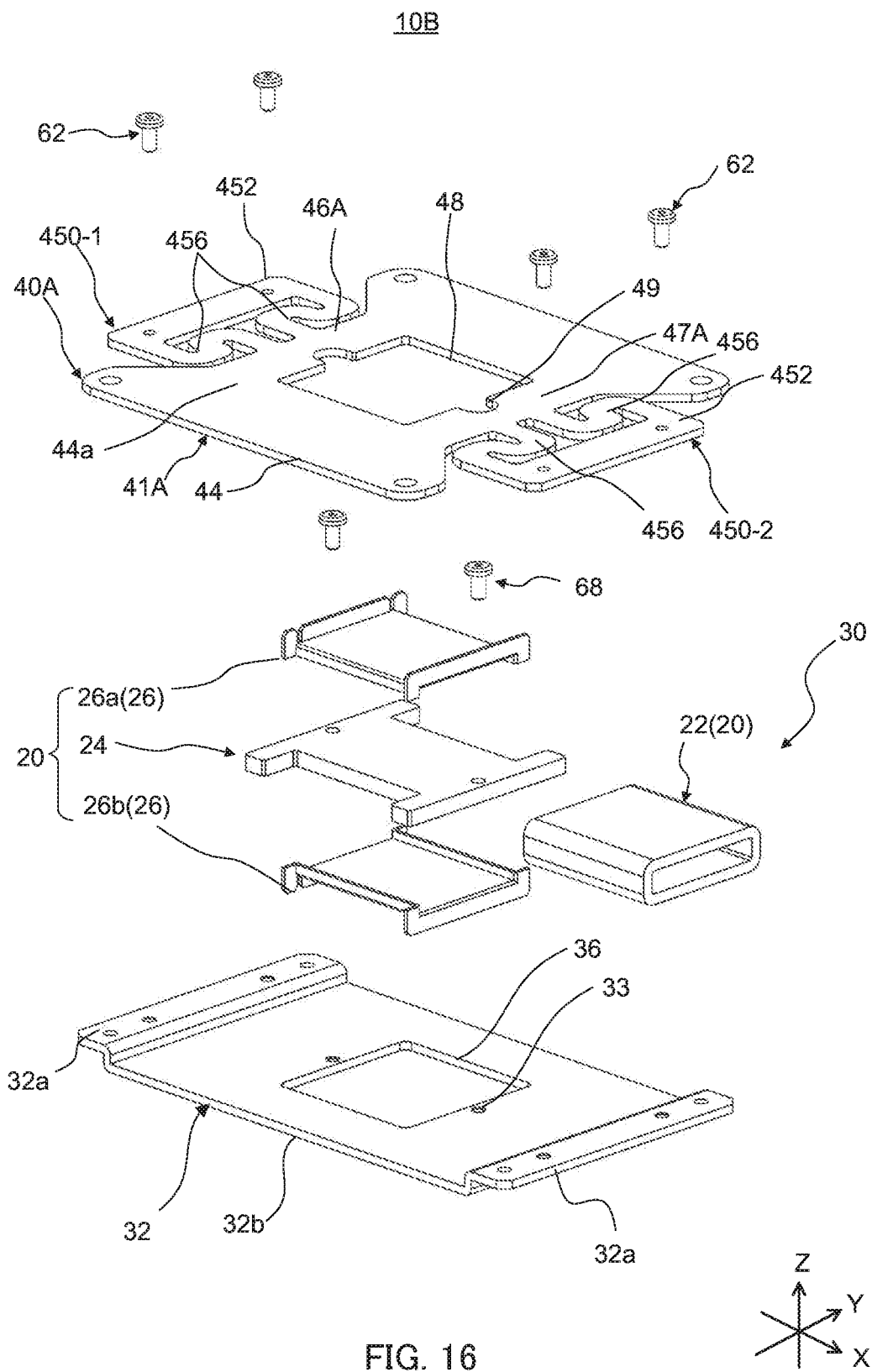
FIG. 16 is an exploded perspective view of Modification Example 2 of the vibration actuator.

FIG. 14 is a plane-side appearance perspective view of Modification Example 2 of the vibration actuator, FIG. 15 is a bottom-surface side appearance perspective view of Modification Example 2 of the vibration actuator, and FIG. 16 is an exploded perspective view of Modification Example 2 of the vibration actuator.

Vibration actuator 10B of Modification Example 2 includes movable yoke 40A that is a single member formed by integrating plate-shaped elastic parts 50 and yoke 41 in the configuration of vibration actuator 10. Vibration actuator 10B includes: fixing part 30 in the configuration of vibration actuator 10; and movable yoke 40A that is movable with respect to fixing part 30.

Movable yoke 40A includes: yoke 41A having the same function as that of yoke 41; and plate-shaped elastic parts 450-1, 450-2 having the same function as that of plate-shaped elastic parts 50 (50-1, 50-2).

Yoke 41A is formed by integrating attracted surface parts 46, 47 of yoke 41 and movable-body side fixing parts 54 of plate-shaped elastic parts 50-1, 50-2 into a single member.

In movable yoke 40A, yoke 41A forms a frame shape surrounding opening part 48 (see FIG. 16) with surface-part fixing part 44 and attracted surface parts 46A, 47A, and plate-shaped elastic parts 450-1, 450-2 are provided to be projected toward the X-direction from attracted surface parts 46A, 47A, respectively.

Each of plate-shaped elastic parts 450-1 and 450-2 includes: fixing-body side fixing part 452 having the same function as that of fixing-body side fixing part 52 of plate-shaped elastic part 50; and bellows-like elastic arm part 456 having the same function as that of bellows-like elastic arm part 56.

With such configuration, yoke 41A and plate-shaped elastic part 450 can be in a same height level with respect to bottom surface part 32b of fixing part 30, so that the thickness (height in the Z-direction) of vibration actuator 10B itself can be reduced for that.

Further, the number of components can be decreased compared to that of vibration actuator 10, so that manufacturing steps can be decreased.

Embodiment 2

Figure 17B:
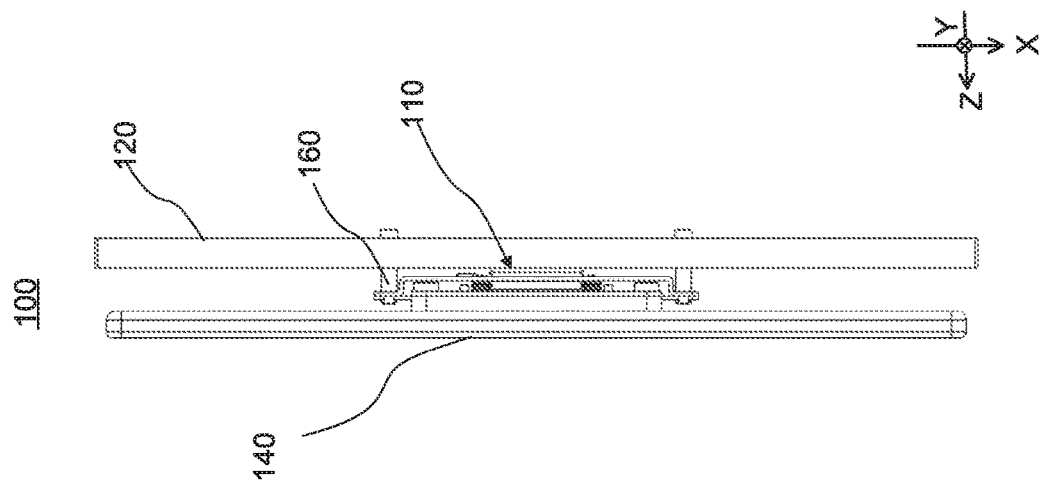
FIGS. 17A and 17B are perspective views of a touch panel apparatus including the vibration actuator according to Embodiment 2 of the present invention.
Figure 17A:
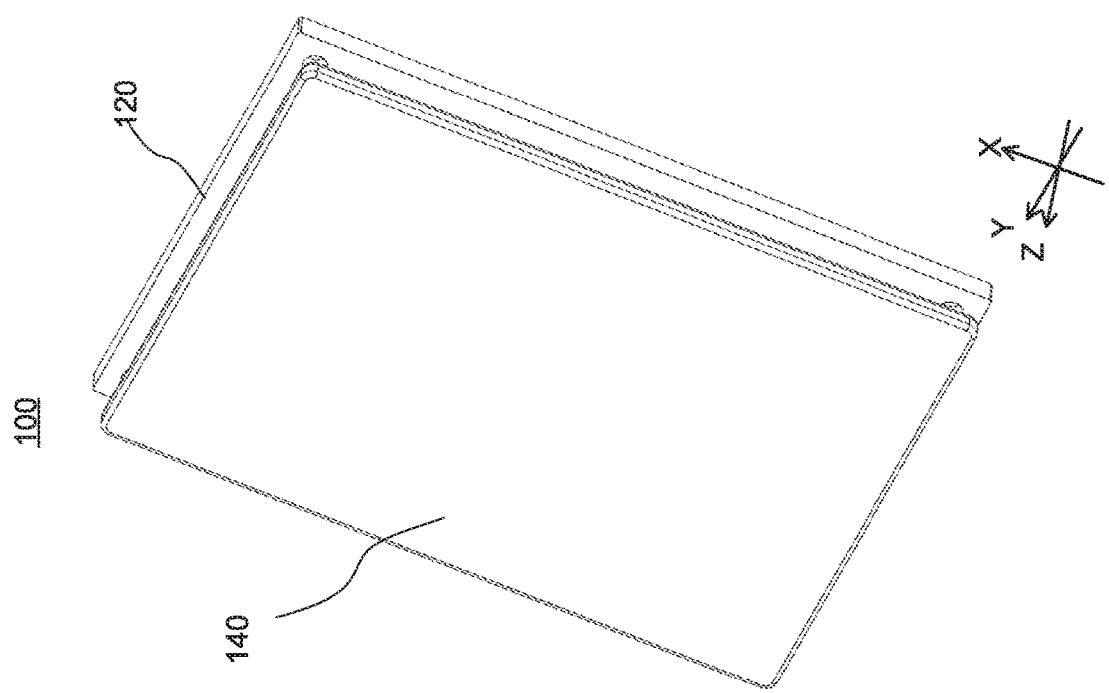

FIGS. 17A and 17B are perspective views of a touch panel apparatus including vibration actuator 10 according to Embodiment 2 of the present invention.

FIGS. 17A and 17B are perspective views of touch panel apparatus 100 including vibration actuator 10 according to Embodiment 2 of the present invention. FIG. 17A is a perspective view of touch panel apparatus 100 including vibration actuator 110 according to Embodiment 2 of the present invention, and FIG. 17B is a right side view of the same apparatus. Touch panel apparatus 100 illustrated in FIG. 17 is an example of a vibration presenting apparatus. Vibration actuator 110 is vibration actuator 10, and it is fixed to back surface plate 120 of touch panel 140 that displays images via connection pillar part 160. Further, while vibration actuator 10 is used as vibration actuator 110, vibration actuator 110 is not limited thereto but may also be vibration actuator 10A or vibration actuator 10B.

In touch panel apparatus 100 including touch panel 140, touch panel 140 is fixed to movable part 40 of vibration actuator 110 having fixing part 30 fixed to the center of back surface plate 120. Note that touch panel 140 is an example of the operation contact surface part, and it is fixed at its back surface side to be in surface-contact with surface-part fixing part 44 of movable part 40. Thereby, touch panel 140 itself integrally drives with movable part 40. In touch panel 140, the direction the operator touches the screen at the time of operations is the same as the vibrating direction of movable part 40 and movable yoke 40A in vibration actuator 110.

As described, with touch panel apparatus 100 on which vibration actuator 10 is mounted, touch panel 140 is directly operated, that is, touch panel 140 together with movable part 40 is driven in the same direction as the finger touching direction. Therefore, touch panel 140 can be directly driven with strong vibration.

Thereby, at the time of operations performed by touching an image such as a mechanical switch displayed on touch panel 140, it is possible to move movable part 40 to give an operational feeling according to the image, such as an operational feeling felt when operating an actual mechanical switch, thereby achieving fine operability with comfortableness.

With in-vehicle products and industrial devices in particular, touch panel apparatus 100 can be applied to an operation apparatus on which operations are inputted by having a finger or the like touch the image on the screen. In that case, touch panel apparatus 100 is effective as a touch display apparatus and an operation apparatus provided with the touch panel apparatus that generates vibration in response to a touch operation of the operator made on the image and returns a same operational feeling as the operational feeling at the time of touching the image such as the mechanical switch displayed on the screen.

Embodiments of the present invention have been described above. Note that descriptions above are exemplifications of the preferred embodiments of the present invention, and the scope of the present invention is not limited thereto. That is, descriptions of the configurations of the apparatuses and shapes of each component are examples, and it is obvious that various changes and modifications of the examples are possible without departing from the scope of the present invention.

INDUSTRIAL APPLICABILITY

Even when attached to a touch panel, the vibration actuator according to the present invention exhibits the effect capable of giving a preferable operational feeling to the user at the time of operating the touch panel and reducing the thickness. For example, the vibration actuator is effective when used for moving the touch panel itself in a car navigation apparatus and the like.

REFERENCE SIGNS LIST

10, 10A, 10B, 110 Vibration actuator
20 Core assembly
22 Coil
24 Core
26 Bobbin
26a, 26b Split body
28 Fixing hole
30 Fixing part
32 Base part
32a Attaching part
32b Bottom surface part
33 Fastening hole
36 Opening part
40 Movable part
40A Movable yoke
41, 41A Yoke
44 Surface-part fixing part
44a Fixing surface
46, 47, 46A, 47A Attracted surface part
48 Opening part (Fixing-part side opening part)
49 Notch
50, 50-1, 50-2, 450-1, 450-2 Plate-shaped elastic part
52, 452 Fixing-body side fixing part
54 Movable-body side fixing part (movable-body side attachment part)
56, 456 Bellows-like elastic arm part
62, 64, 68 Screw
70 Detection sensor
80 Electrostatic capacitance sensor
92, 94, 98 Rivet
100 Touch panel apparatus
120 Back surface plate
140 Touch panel
160 Pillar part
241 Core main body
242, 244 Magnetic pole part

What is claimed is:

1. A vibration actuator, comprising:
    a fixing part including a coil, and a core around which the coil is wound, the core including both ends projecting from the coil;
    a movable part disposed such that the movable part faces the both ends of the core at a position close to the both ends of the core with a gap provided between the movable part and the both ends of the core in a vibration direction orthogonal to a winding axis of the coil, the movable part including a yoke formed of a magnetic material, and the movable part being fixable to an operation contact surface part that is operated by contact; and
    a plate-shaped elastic part fixed between the movable part and the fixing part, the plate-shaped elastic part including an elastically deformable bellows-shaped part, the plate-shaped elastic part elastically supporting the movable part to be movable with respect to the fixing part in the vibration direction.

2. The vibration actuator according to claim 1, wherein a plurality of the plate-shaped elastic parts are fixed at symmetrical positions with respect to a center of the movable part.

3. The vibration actuator according to claim 2, wherein
    the movable part includes a surface including a trapezoidal shape in a plan view and including a plurality of recesses at positions symmetrical with respect to the center, the recesses being defined by a hypotenuse of the trapezoidal shape, and
    the plate-shaped elastic part are arranged at positions symmetrical with respect to the center in the plurality of recesses in a plan view.

4. The vibration actuator according to claim 1, wherein the plate-shaped elastic part connects the movable part and the fixing part together, and includes at least two or more arm parts each having the bellow-shaped part.

5. The vibration actuator according to claim 1, wherein the core is formed in an H-type shape and the both ends of the core project in a direction orthogonal to a winding axis direction of the coil in a portion around which the coil is wound, the both ends are projected in a direction orthogonal to the winding axis direction of the coil, and the core includes counter surface parts provided in parallel to each other with a space interposed therebetween, each of the counter surface parts being provided opposite to the yoke via the gap.

6. The vibration actuator according to claim 1, wherein:
the plate-shaped elastic part is formed of a magnetic material, and
a movable-body side attachment part of the plate-shaped elastic part is disposed in a winding axis direction of the coil or a direction orthogonal to the winding axis direction with respect to each of the both ends of the core, and forms a magnetic path together with the core when the coil is energized.

7. The vibration actuator according to claim 1, wherein the yoke is disposed with the gap provided between the yoke and both ends of the core in the vibration direction, and includes, at a position opposite to the coil, an opening part to which the coil is inserted.

8. The vibration actuator according to claim 1, wherein:
the fixing part comprises a base part including a fixing-part side opening part to which a part of the coil is inserted and disposed, and
the core is fixed to the base part in a state where a part of the coil is disposed inside the fixing-part side opening part.

9. The vibration actuator according to claim 1, wherein the plate-shaped elastic part is fixed by a screw or a rivet.

10. The vibration actuator according to claim 1, wherein the plate-shaped elastic part includes a strain sensor for detecting a push-in amount when the plate-shaped elastic part is pushed in.

11. The vibration actuator according to claim 1, wherein the fixing part includes an electrostatic capacitance sensor for detecting a push-in amount when the plate-shaped elastic part is pushed in, the electrostatic capacitance sensor being provided opposite to the plate-shaped elastic part.

12. The vibration actuator according to claim 1, wherein the plate-shaped elastic part is a member integrated with the yoke.

13. A vibration presenting apparatus, comprising:
the vibration actuator according to claim 1; and
a touch panel on which the vibration actuator is mounted.

14. The vibration actuator according to claim 1, wherein a fixing-body side fixing part of the plate-shaped elastic part is fixed to an upper surface of an attaching part of the fixing part, and
a movable-body side fixing part of the plate-shaped elastic part is fixed to the upper surface of the movable part in a laminated state on the movable part, the movable part being arranged such that a height of an upper surface of the movable part is equal to or less than a height of an upper surface of the fixing part at the fixing-body side fixing portion.

15. The vibration actuator according to claim 1, wherein the plate-shaped elastic part includes a plurality of the bellows-shaped parts having the same height of an upper surface in the vibration direction.

16. The vibration actuator according to claim 1, wherein the plate-shaped elastic part includes a plurality of the bellows-shaped parts formed at different positions in a direction orthogonal to the winding axis of the coil.

* * * * *